United States Patent
Fan et al.

(10) Patent No.: US 11,835,674 B1
(45) Date of Patent: *Dec. 5, 2023

(54) METHODS OF ANALYZING CEMENT INTEGRITY IN ANNULI OF A MULTIPLE-CASED WELL USING MACHINE LEARNING

(71) Applicant: Schlumberger Technology Corporation, Sugar Land, TX (US)

(72) Inventors: Bo Fan, Medford, MA (US); Maja Skataric, Cambridge, MA (US); Sandip Bose, Brookline, MA (US); Shuchin Aeron, Medford, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,143

(22) Filed: Nov. 7, 2022

Related U.S. Application Data

(63) Continuation of application No. 16/759,667, filed as application No. PCT/US2018/057429 on Oct. 25, 2018, now Pat. No. 11,493,659.

(Continued)

(51) Int. Cl.
*G01V 1/50* (2006.01)
*E21B 47/005* (2012.01)

(52) U.S. Cl.
CPC .............. *G01V 1/50* (2013.01); *E21B 47/005* (2020.05); *E21B 2200/22* (2020.05); *G01V 2210/324* (2013.01); *G01V 2210/60* (2013.01)

(58) Field of Classification Search
CPC .......... E21B 47/005; G06N 3/08; G06N 3/04; G06N 20/10; G01V 1/50; G01V 1/46
See application file for complete search history.

(56) References Cited

U.S. PATENT DOCUMENTS

| 4,594,691 A | 6/1986 | Kimball |
| 10,705,056 B2 * | 7/2020 | Lei ........................ E21B 47/005 |

(Continued)

FOREIGN PATENT DOCUMENTS

| WO | 2015108639 A1 | 7/2015 |
| WO | 2016187239 A1 | 11/2016 |

(Continued)

OTHER PUBLICATIONS

"Isolating potential flow zones during well construction," in American Petroleum Institute Recommended Practice, vol. 65—Part 2, 96 pages, 2010.

(Continued)

*Primary Examiner* — Elias Desta
(74) *Attorney, Agent, or Firm* — Ashley E. Brown

(57) ABSTRACT

A sonic tool is activated in a well having multiple casings and annuli surrounding the casing. Detected data is preprocessed using slowness time coherence (STC) processing to obtain STC data. The STC data is provided to a machine learning module which has been trained on labeled STC data. The machine learning module provides an answer product regarding the states of the borehole annuli which may be used to make decision regarding remedial action with respect to the borehole casings. The machine learning module may implement a convolutional neural network (CNN), a support vector machine (SVM), or an autoencoder.

19 Claims, 44 Drawing Sheets

Related U.S. Application Data

(60) Provisional application No. 62/577,945, filed on Oct. 27, 2017.

(56) References Cited

U.S. PATENT DOCUMENTS

| | | | |
|---|---|---|---|
| 10,858,933 B2* | 12/2020 | Bose | G01V 1/44 |
| 10,995,606 B2 | 5/2021 | Skataric | |
| 11,493,659 B2* | 11/2022 | Fan | E21B 47/005 |
| 2002/0183930 A1 | 12/2002 | Plona et al. | |
| 2009/0168597 A1 | 7/2009 | Wu | |
| 2012/0037423 A1 | 2/2012 | Geerits | |
| 2015/0219780 A1 | 8/2015 | Zeroug et al. | |
| 2016/0003036 A1 | 1/2016 | Mickael | |
| 2018/0142545 A1 | 5/2018 | Lei | |
| 2019/0055830 A1 | 2/2019 | Skataric | |
| 2021/0181366 A1 | 6/2021 | Fan | |

FOREIGN PATENT DOCUMENTS

| | | | |
|---|---|---|---|
| WO | 2016187240 A1 | 11/2016 |
| WO | 2016187242 A1 | 11/2016 |
| WO | 2017151834 A1 | 9/2017 |

OTHER PUBLICATIONS

Pistre et al., "A modular wireline sonic tool for measurements of 3d (Azimuthal, Radial, and Axial) formation acoustic properties," in SPWLA 46th Annual Logging Symposium, 2005, 13 pages.

Bose et al., "Semblance criterion modification to incorporate signal energy threshold", in SEG Annual Meeting, 2009, 6 pages.

Search Report and Written Opinion of International Patent Application No. PCT/US2018/057429 dated Mar. 11, 2019; 10 pages.

International Preliminary Report on Patentability of International Patent Application No. PCT/US2018/057429 dated May 7, 2020; 7 pages.

Kimball and Marzetta, "Semblance processing of borehole acoustic array data", Geophysics, vol. 49, No. 3, Mar. 1984, pp. 274-281.

Rama Rao and Toksoz, "Dispersive wave analysis—method and applications", Earth Resources Laboratory Industry Consortia Annual Report, MIT, 2005, 20 pages.

Hsu and Lin, "A comparison of methods for multiclass support vector machines", IEEE Trans Neural Network, vol. 13, No. 2, pp. 415-425, 2002.

Chollet, "Building autoencoders in keras", in The Keras Blog. Https://blog.keras.io/building-autoencoders-in-keras.html, May 14, 2016, 18 pages.

Prahallad, "Speech technology: A practical introduction", in Carnegie Mellon University International Instittue of Information Technology Hyderabad PPT, 2003, 50 pages.

Young et al., The HTK Book (Version 3.4), Cabridge University Engineering Department, 2006.

Wikipedia, "Convolutional neural network", in Online, 2016.

Karpathy et al., "Large-scale video classification with convolutional neural networks", in Conference on Computer on Computer Vision and Pattern Recognition (Cvpr), IEEE, 2014, 8 pages.

Tompson et al., "Efficient object localization using convolutional networks", in Conference on Computer Vision and Pattern Recognition (CVPR), IEEE, 2015, pp. 648-658.

Ruder, "An overview of gradient descent optimization algorithms", in Online, Jan. 19, 2016, Available: http://sebastianruder.com/optimizing-gradient-descent/, 17 pages.

Radon, "On the Determination of Functions from their Integral Values Along Certain Manifolds", IEEE Transactions on Medical Imaging, vol. MI-5, No. 4, pp. 170-176, Dec. 1986.

Extended Search Report issued in European Patent Application No. 18869615.7 dated Jun. 21, 2021, 9 pages.

Liu J. C. et al., "Intelligent Evaluation Model for Cementing Quality Based on PSO-SVM and Application", Applied Mechanics and Materials, 2011, vols. 71-78, pp. 4293-4299.

Communication Pursuant to Article 94(3) issued in European Patent Application No. 18869615.7 dated Mar. 10, 2023, 8 pages.

\* cited by examiner

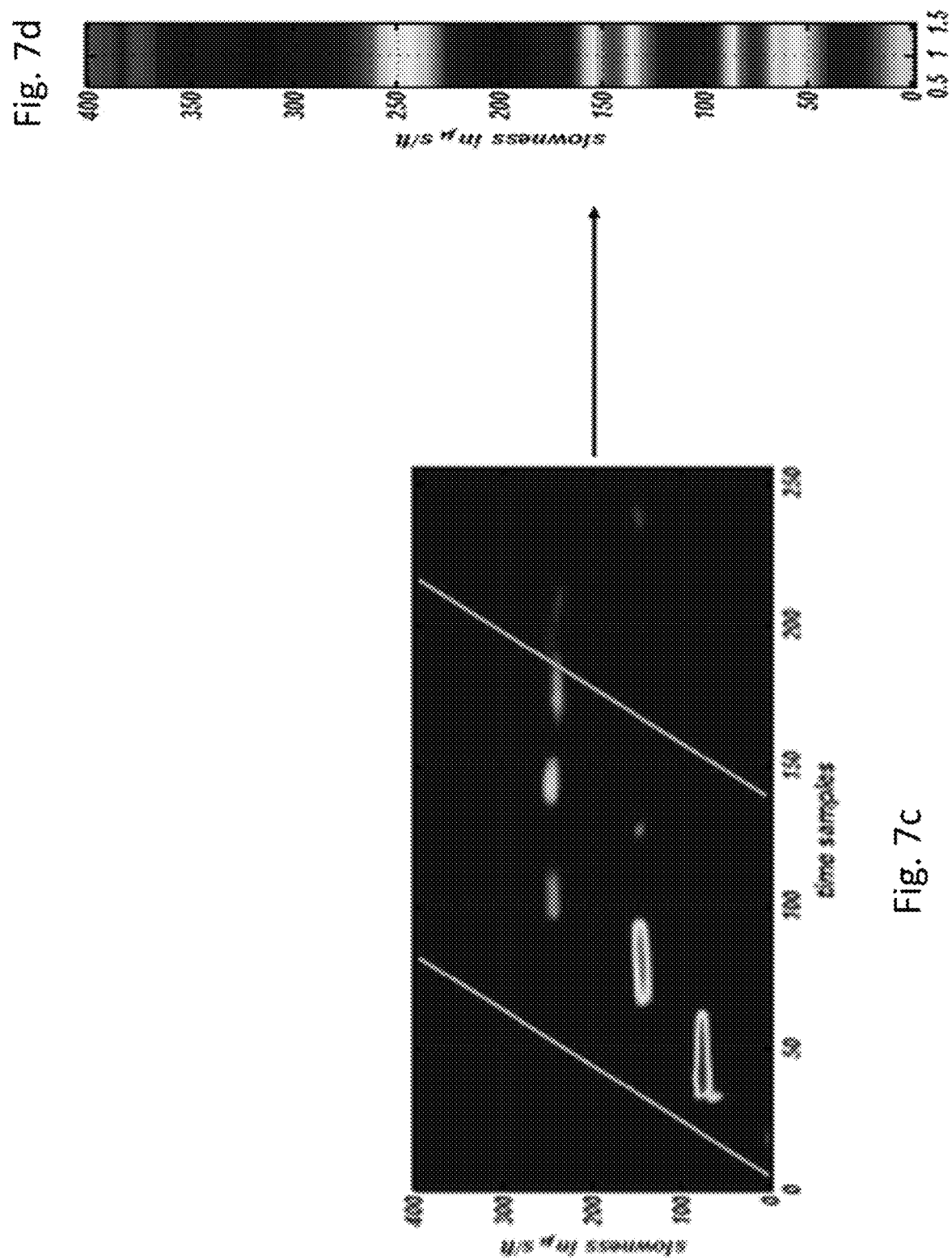

(a) Monopole, BPF1

(b) Monopole, BPF2

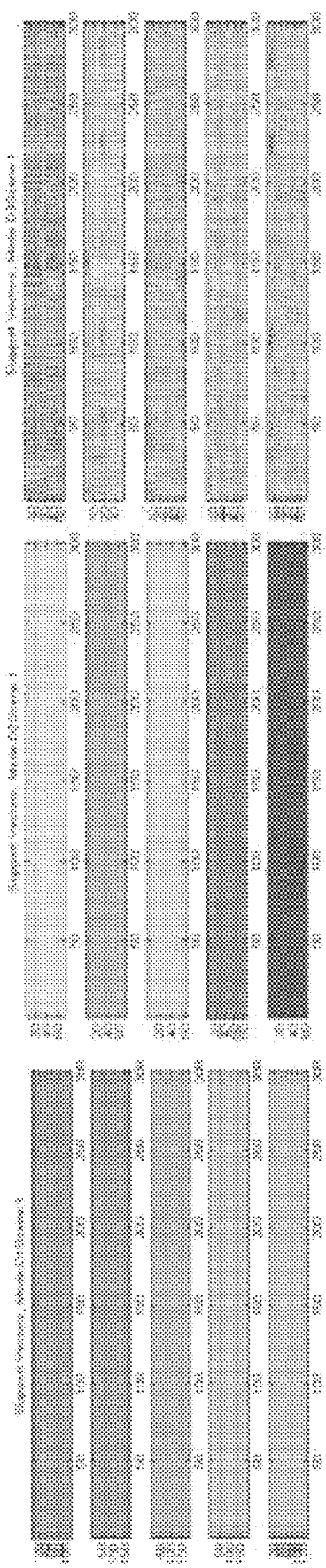
Fig. 26c (c) Dipole, BPF1
Fig. 26d (d) Dipole, BPF2
Fig. 26e (e) Dipole, BPF3

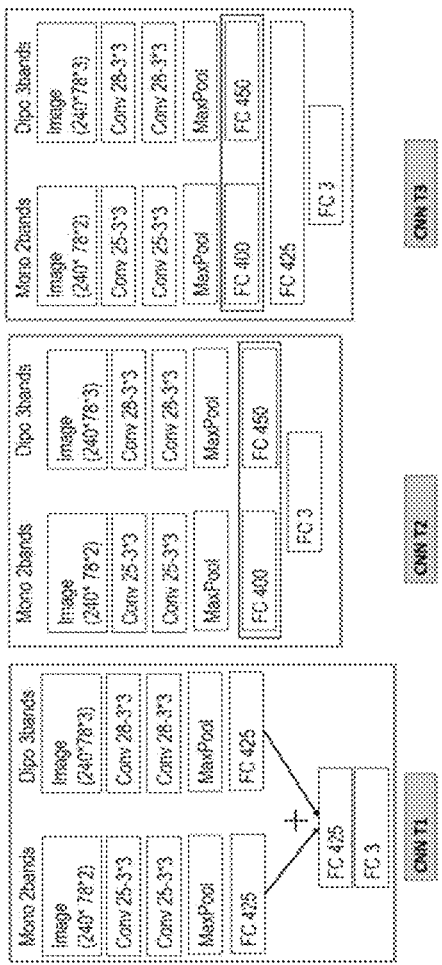

METHODS OF ANALYZING CEMENT INTEGRITY IN ANNULI OF A MULTIPLE-CASED WELL USING MACHINE LEARNING

CROSS-REFERENCE TO RELATED APPLICATIONS

This application is a continuation patent application of U.S. patent application Ser. No. 16/759,667, filed Apr. 27, 2020, now U.S. Pat. No. 11,493,659 which is a 35 U.S.C. 371 application of International Patent Application: PCT/US2018/057429, filed on Oct. 25, 2018 and which claimed the benefit of priority under 35 U.S.C. 119(e) to U.S. Provisional Patent Application No. 62/577,945, filed Oct. 27, 2017, the entire contents of which are incorporated herein by reference.

FIELD

This disclosure relates to well logging in oil and gas fields. In particular, this disclosure relates to analyzing the status, for example, the cement integrity of annuli in a multiple-cased oil and gas well.

BACKGROUND

Effective diagnosis of well zonal isolation has become important with the recent advent of harsher governmental regulations that call for oil and gas operators to deliver and maintain wells with competent pressure seals. The goal is to prevent uncontrolled flow of subterranean formation fluids causing leaks into the atmosphere or into other formations. See, e.g., "Isolating potential flow zones during well construction," *American Petroleum Institute Recommended Practice*, Vol. 65-Part 2, 2010. The diagnosis could be carried out following a cementation job or during the life of a well or at the end of its life before plug and abandonment.

Acoustic measurements are widely used to diagnose the condition and placement of the cement and its bond to interfaces in contact with it. The current methods, encompassing high frequency sonic CBL-VDL (See, V. Piste, et al., "A modular wireline sonic tool for measurements of 3d formation acoustic properties," *SPWLA 46th Annual Logging Symposium,* 2005) and ultrasonic measurements, are designed for single casing strings and therefore can be used at best only for the diagnosis of the annulus behind the innermost casing string and the bonds therein. However, in several markets including plug and abandonment, there is increasing interest in diagnosing the placement and bond of cement behind more than one string to avoid costly operations of cutting and pulling casing and multiple logging runs. To address this market, there is a need for additional measurements and/or processing approaches that leverage the possibility of probing deeper than the first casing and annulus while addressing the challenges of diagnosing the cement placement behind second casings despite the increased complexity of the measurement physics in multiple casing strings. Co-owned patent applications to S. Zeroug, et al., U.S. 20150219780 and to S. Bose et al., WO/2016US32965A propose a joint diagnosis of multiple acoustic modalities leveraging their independent sensitivities. The anticipated result is a more robust diagnosis of the content of the annulus and whether it provides hydraulic isolation based on quantitative inversion of relevant parameters. The S. Zeroug et al. application proposes a model-based inversion of the relevant parameters.

In practice, however, continuous logs covering thousands of feet along the well must be generated and it may not be feasible with the available computational resources to invert beyond a few selected locations. For such a scenario, to cover the tens of thousands of depth frames, the S. Bose et al. application proposed a different approach of extracting attributes or features from all the available measurements and using those in machine learning algorithms to make a categorical diagnosis of not only the first annulus but also the annuli and bond conditions beyond the second casing. In addition, the sonic measurements are in themselves quite rich as they include monopole and dipole logging modes that interrogate the cased hole system in diverse ways, enabling such a diagnosis. Three additional co-owned patent applications to B. Sinha, et al., WO2014/US70255A, and to T. Lei, et al., WO2016/186240 and WO2016/187239 are devoted to techniques employing sonic data for well integrity diagnosis. In another co-owned patent application to M. Skataric, et al., WO2017/151834, a methodology is outlined to process and display data over depth intervals with emphasis on features that indicate discontinuities indicative of such depth dependent transitions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This subject disclosure relates to cement barrier integrity in cased oil and gas wells with multiple casing strings.

The subject disclosure outlines an approach for the evaluation of well integrity in dual and multi-string casings using sonic data that reads deeper than the first casing and annulus. The array sonic data comprising one or more of monopole, dipole and quadrupole modalities from one or more sources is pre-processed via a transform such as the (normalized) slowness time coherence (STC) transform, or the related (non-normalized) Radon transform into a geophysical meaningful domain such as slowness-time domain. The resulting 2-D or 1-D intermediate results are fed into a machine learning module such as a support vector machine (SVM), an auto-encoder, or a convolutional neural network (CNN) which has been trained with a training data set having labeled samples to learn features and discriminators particularly for the state of annuli behind the casings. The structure of the network is heuristically designed to achieve reliable performance. The output of the machine learning module is an answer product as to the states of the annuli behind the casings at the depth in the formation from which the array sonic data was gathered. Data from multiple depths may be used to obtain answer products at different locations along the wellbore and the answer products may be used for determining remedial or other actions to be taken.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 7a-7d respectively depict a sonic acquisition tool acquiring data, the receiver data as a function of receiver and time, an STC two-dimensional (2D) image, and an STC one-dimensional image obtained from a projection of the STC 2D image;

FIGS. 26a-26h depict support vectors corresponding to various multiband modalities for five labels of interest;

FIGS. 34a-34c are two stream CNN frameworks for combining results from monopole and dipole data.

DETAILED DESCRIPTION

Figure 1:
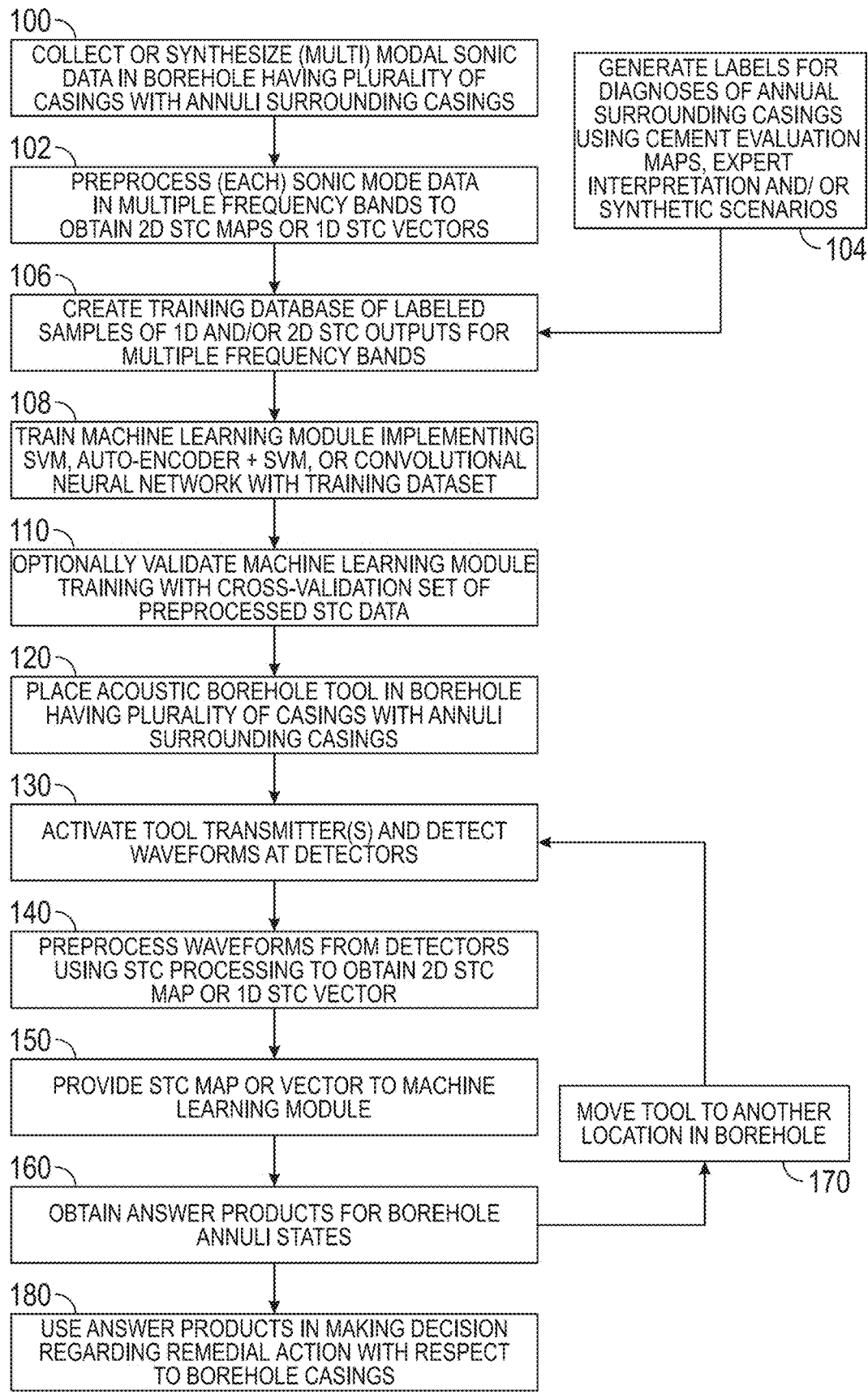
FIG. 1 is a high-level flow-chart of disclosed methods for analyzing annuli of a multiple-cased well using machine learning.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

In the subject disclosure, machine learning approaches are presented to extract and train on features of sonic data over depth using any of a variety of algorithms to identify several proposed classes for two annuli ("annulus A" and "annulus B") given the availability of data with labels for those classes. Thus, as suggested in FIGS. 1, at 100, 102, 104, 106, and 108, a machine learning module is trained with a training data set having labeled samples to learn features and discriminators for the state of annuli behind casings of a wellbore. More particularly, at 100, sonic data is collected or synthesized with respect to a borehole having a plurality of casings with annuli surrounding the casings. The sonic data that is collected may include one or both of monopole and dipole sonic data. At 102, the sonic data may be divided into multiple frequency bands, and the data is processed to obtain 2D STC time-slowness maps or 1D slowness projection vectors. At 104, labels for various status conditions of interest of the annuli surrounding the casings are generated. The labels and the preprocessed sonic data in the form of the STC maps or vectors are then used at 106 to create a training dataset of labeled samples of 1D and/or 2D STC outputs for one or more frequency bands of the monopole and/or dipole data. The training dataset is then used to train a machine learning module which receives and trains on the information. Examples of suitable machine learning modules include a support vector machine (SVM), an auto-encoder—SVM combination, or a convolutional neural network (CNN). To ascertain whether the machine learning module is properly trained, a cross-validation set of preprocessed STC 2D or projected 1D information (e.g., a portion of the training dataset) may be utilized at 110. Regardless, once the machine learning module is suitably trained, an acoustic borehole tool may be placed at 120 at a location in a borehole having a plurality of casings with annuli surrounding the casings, and the (monopole and/or dipole) transmitter(s) may be activated at 130 so that acoustic energy is radiated into the casings surrounding the borehole and waveforms are detected at the detectors of the acoustic borehole tool. At 140, the detected waveforms are preprocessed using slowness-time-coherence (STC) processing to obtain a 2D STC map, or a 1D STC vector projection. At 150, the 2D STC map or 1D STC vector projection is provided to the trained machine learning module, and at 160, the machine learning module provides an answer product as to the states of the annuli behind the casings of the wellbore. As suggested in FIG. 1, the borehole tool may be moved at 170 to another location in the borehole where the transmitter(s) may be activated and waveforms detected at 130, STC processing conducted at 140, and resulting STC map or vector projection provided to the trained machine learning module at 150 so that additional answer product may be generated at 160 for that location in the borehole. The answer products for one or more depths in the borehole may be used at 180 in a decision regarding the necessity or not of taking remedial action with respect to the borehole. Thus, by way of example only, if it is determined that both annuli are not properly cemented in a wellbore which is going to be abandoned, a decision may be made to remove the casings from the wellbore prior to injecting cement into and capping the wellbore.

The following disclosure relates to details of implementing aspects of certain elements of FIG. 1.

Figure 1A:
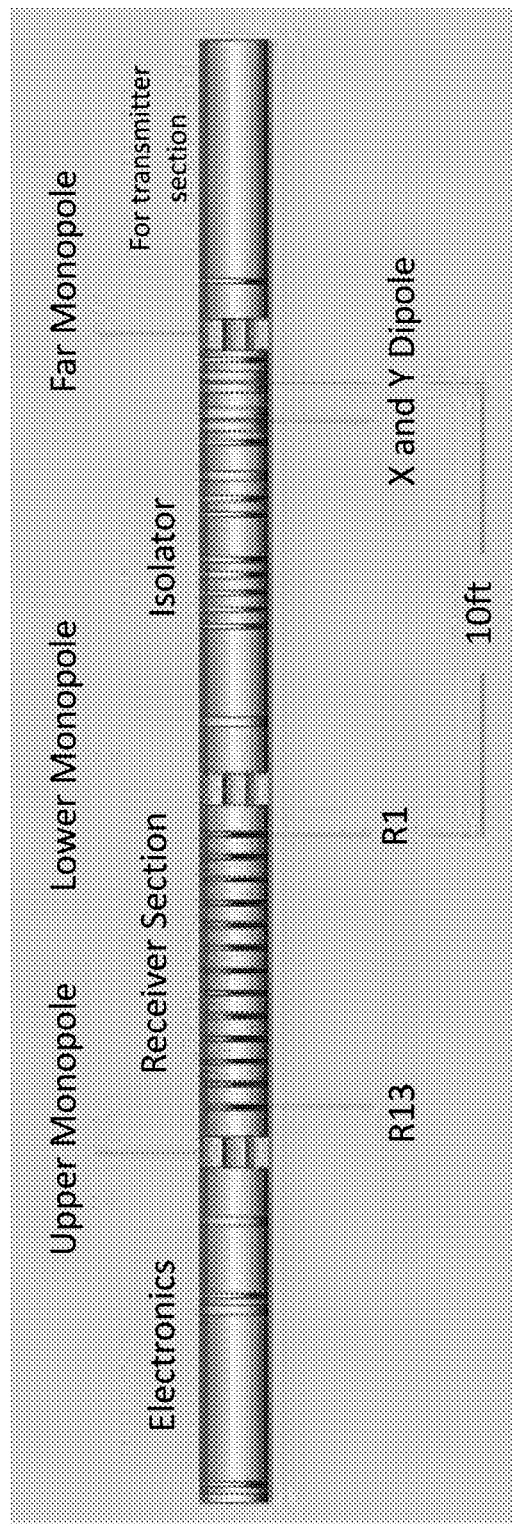
FIGS. 1a and 1b depict a wireline Sonic Scanner tool, showing the transmitters and receiver array and cross-dipole firings.
Figure 1B:
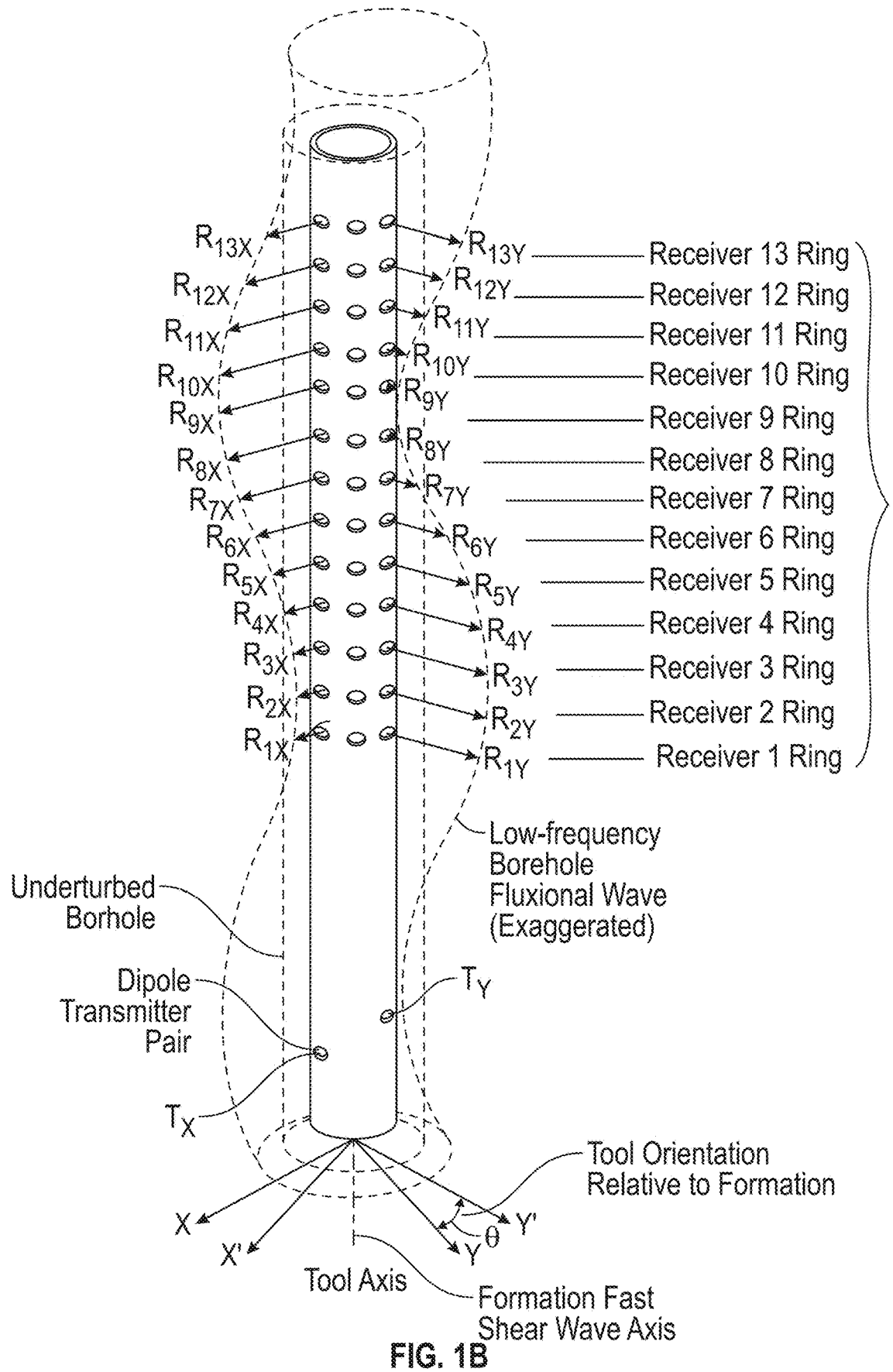

FIG. 1*a* depicts a wireline tool such as the Sonic Scanner with a multiplicity of transmitters and a 2-D axial and azimuthal array of receivers which may be used in conjunction with the activation of transmitters so that acoustic energy is radiated into the casings surrounding the borehole and detecting waveforms at the detectors of the acoustic borehole tool at 130. It may also be used in conjunction with the collection of sonic data at 100 for the purpose of generating training datasets at 106. The Sonic Scanner has the capability of acquiring wideband sonic modal logging measurements with the signal frequency ranging from 200 Hz to 12 kHz. In a "Record-All-Data" acquisition mode of the tool, the measurement is very rich in data as multiple borehole modes are excited and detected using the multiple transmitters and individual recordings of receivers in the 2-D array. These include the monopole mode that can be excited both at low and high frequencies and with far and near (to the receiver array) monopole sources, and the dipole mode that can be excited at two orthogonal directions yielding cross-dipole excitation as seen in FIG. 1*b*. While these sonic measurements have not previously been used for well integrity applications and have some of the same limitations such as a lack of azimuthal resolution (monopole) or only two quadrant resolution (dipole), low axial resolution (of the order of 1 m), and sensitivity to multiple mechanisms over the probed region, they have the capability to probe beyond the first casing and annulus, and therefore bring the capacity for a diagnosis of the annuli in multiple casing configurations. This is particularly true if the inner casing and annulus state are known or determined by another measurement such as the high resolution ultrasonic from the Isolation Scanner.

Figure 2:
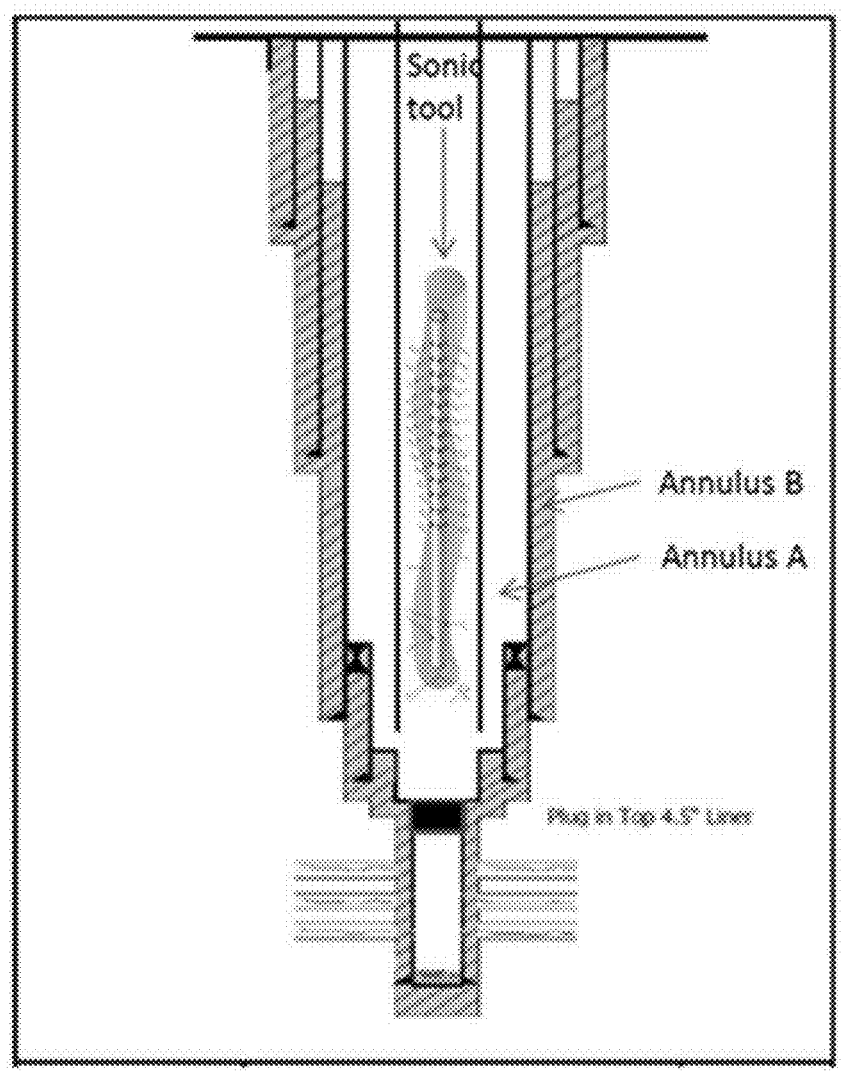
FIG. 2 is a depiction of a sonic tool located in a multiple-casing string well.

FIG. 2 depicts a typical multiple casing configuration in an oil and gas well in which the acoustic borehole tool is placed at 120 of FIG. 1. A series of casings are deployed inside the wellbore in telescopic fashion. The annulus behind each casing is partially or fully filled with cement to assure well integrity and zonal isolation of various formations layers. In some situations, it may be necessary to evaluate the annular fill and bond in cement behind multiple overlapping casings with a tool deployed in the fluid filled innermost casing. Examples of potential diagnoses of annulus A (behind first casing; i.e., between the first and second casings) and annulus B (behind second casing) are depicted for a dual casing scenario.

In one aspect, in assessing the necessity or desirability of taking remedial action with respect to the borehole, those of skill in the art may be interested in some or all of the following scenarios or answer products (such as are obtained at 160):

1. Full bond (both annuli are cemented);
2. The inner annulus (annulus A) is liquid, and the outer annulus (annulus B) is cemented;
3. Annulus B is liquid, and annulus A is cemented;
4. Both annuli are liquid-filled;
5. Barite sag in one or both annuli; and
6. Partial bond in one or both annuli.

Other scenarios may also be of interest to those of skill in the art.

In one embodiment, the six scenarios are considered for formations having distinct types of acoustic properties, such as formations that are "super-fast", "fast", "medium", and "slow" (all referring to the velocity of sound waves in the formation), for the purpose of encompassing a range of possible sonic responses that could provide identifying features. Typical range values for these formation types are summarized in Table 1 below, where $DT_c$ is the compressional slowness (with slowness being the inverse of velocity), $DT_s$ is the shear slowness, and $\rho$ is the formation density. For example, the type of formation (slow vs. fast) imposes constraints on the ranges of frequencies/slownesses in which to search for the distinguishing features as described below. Hence, scenarios or features may be defined within a particular formation type, leading to a total of twenty-four classes where there are six scenarios and four formation types, (e.g., double casing with cemented annulus A and liquid annulus B, in a fast formation, etc.). This framework can be extended to deal with partial bond cases in more detail, by determining at which interface the disbonding occurs. With more scenarios, the number of classes increases accordingly.

In the following disclosure, methodologies are described to leverage machine learning in order to generate an indicator (answer product at 160 of FIG. 1) for the onset of a free pipe (i.e., uncemented casing) for one or more strings in the multi-string cased hole. The methodologies and conclusions are demonstrated on synthetic data. In addition, depth dependent displays of dispersion and slowness semblance projections for identifying transitions in the annuli in such scenarios are described.

Synthetic Dataset Description

Figures 3A, 3B:
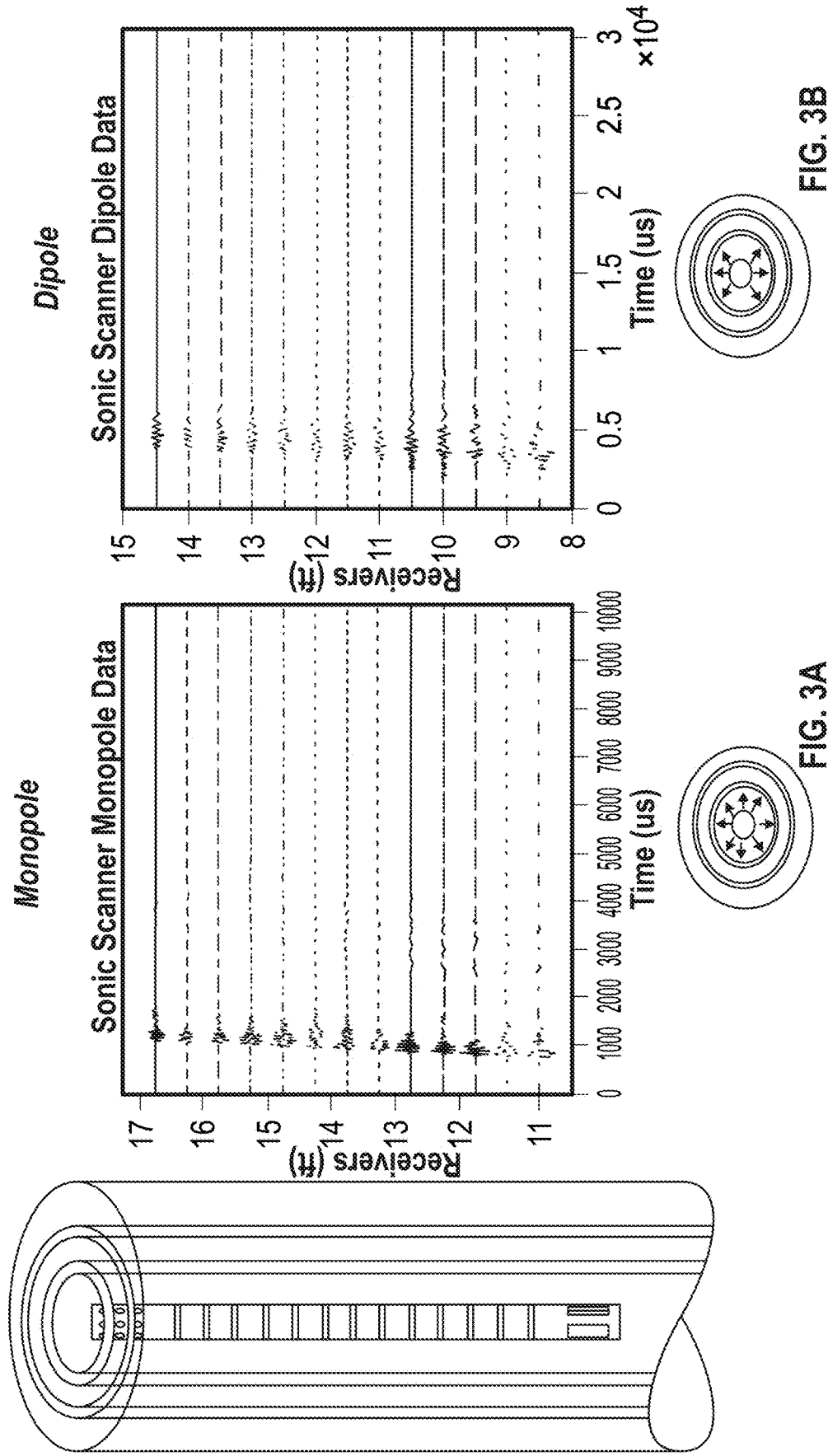
FIGS. 3a and 3b respectively depict monopole and dipole modalities excited by a Sonic Scanner™ tool, together with their waveforms and direction of source firing.

Synthetic data which may be used for training a machine learning module may be generated through modeling software (100 of FIG. 1). In one embodiment, the synthetic data may pertain to measurements obtained by a Sonic Scanner tool. Acquired simulated data could be obtained from monopole and/or dipole sources, with FIGS. 3a and 3b respectively depicting monopole and dipole modalities excited by a Sonic Scanner tool, together with their waveforms and direction of source firing.

In the posited classification problem, for illustration purposes, classification of two sections encompassing double casing string scenarios with annulus A and B is considered for the following five scenarios: (A=Hard cement, B=Hard cement); (A=Lite cement, B=Lite cement); (A=Water, B=Hard cement), (A=Water, B=Lite cement), and (A=Water, B=Water). Each scenario is provided as a "label" (104 of FIG. 1). For example, the label W-HC corresponds to the third listed scenario with annulus A (between two casings) being water-filled (W) and annulus B (between the second casing and the formation) having hard cement (HC). The goal is to identify these sections and the transitions. HC, LC, and W may be used to represent hard cement, lite cement, and water, respectively. Thus, as suggested above, the label W-HC may be used to indicate water in annulus A and hard cement in annulus B.

For purposes of illustration, and by way of example only, for each label and modality (monopole/dipole), twenty-five synthetic sonic data cubes (time, receiver, depth) are generated for the training step in the learning framework. The nominal values and range of physical properties corresponding to each fill and formation type are shown in Table 1.

TABLE 1

Table of acoustic properties with nominal values and ranges for formation types and annular and borehole fill considered for scenarios being tested. For purpose of generating synthetics for training, a range of values around each nominal value for formation types is used and sampled to mimic typical variation in natural sub-surface formations.

| FORMATION | | | |
|---|---|---|---|
| Type | $DT_c$ (μs/ft) | $DT_s$ (μs/ft) | ρ (g/cm³) |
| Super fast | 62.5 ± 10 | 108.2 ± 20 | 2.58 ± 0.1 |
| Fast | 80 ± 10 | 160 ± 20 | 2.3 ± 0.1 |
| Medium 1 | 100 ± 10 | 240 ± 20 | 2.2 ± 0.1 |
| Medium 2 | 120 ± 10 | 250 ± 20 | 2.2 ± 0.1 |
| ANNULUS | | | |
| Content | $DT_c$ (μs/ft) | $DT_s$ (μs/ft) | ρ (g/cm³) |
| Hard Cement | 82 | 149 | 2 |
| Lite Cement | 157 | 406 | 1.43 |
| Mud in ansplus A | 260 | inf | 1.52 |
| Mud in anmulus B | 220 | inf | 1.37 |
| Borehole Mud | 105 | inf | 1.2 |

Figure 5:
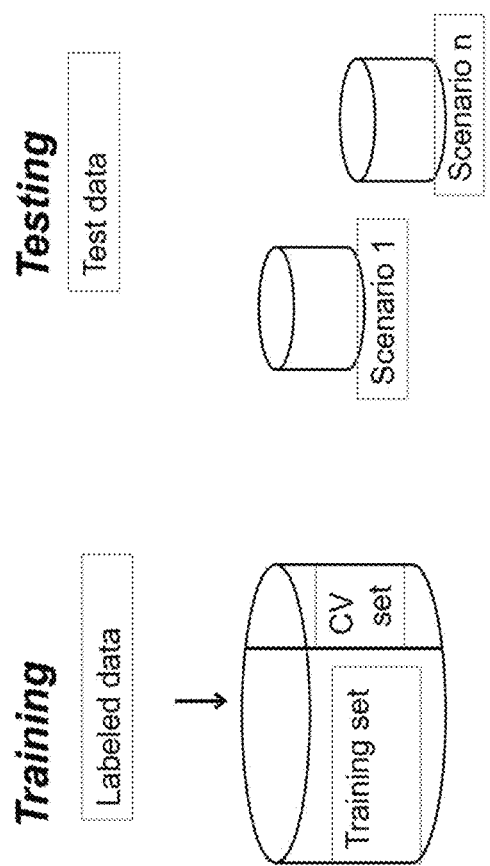
FIG. 5 shows training and testing datasets.

At each location (corresponding to each data cube), the waveforms are sampled from 30 depth frames, and using a thirteen-receiver array (as shown in FIGS. 1a and 1b). For each waveform, there are 601 time samples. For simplicity, only a subset of the generated 25 data cubes are used. The above-mentioned cubes (or runs) of data, after appropriate processing (described hereinafter) are used to generate a "labeled dataset", which are used for training the model (106 of FIG. 1). The labeled dataset is subsequently split into a "training set" (108 of FIG. 1), used to learn the representation of the data, and a "cross-validation" (CV) Set, that may be used (at 110 of FIG. 1) to compute the classification accuracy of the trained model, given the unseen new data, for which the exact labels are known as suggested by FIG. 5.

TABLE 2

Scenarios and depth indices used to create Testing dataset.

| Monopole and Dipole Data | | | | |
|---|---|---|---|---|
| Scenario | Sample range | Label | Annulus A | Annulus B |
| Scene 1 | 1:65 | 1 | HC | HC |
| | 66:135 | 3 | W | HC |
| | 136:200 | 5 | W | W |
| Scene 2 | 1:75 | 2 | LC | LC |
| | 76:125 | 4 | W | LC |
| | 126:200 | 5 | W | W |

For testing purposes, two synthetic test sets (referred to here as "Scenario 1" or "Scene 1", and "Scenario 2" or "Scene 2") are generated, encompassing both monopole and dipole modalities, and representing data received over 200 depth frames. These sets will be referred to as "Test data", or "Unlabeled data". The detailed list of labels and their depth ranges for the two scenarios are shown in Table 2. The classification accuracy of the learned network may be assessed on the unlabeled (test) datasets since labels have been created for the two scenarios. However, in real applications the network will only have access to the labels for training and cross-validation from prior modeling, expert elicitation, or previous data labeling and acquisition.

Figure 4:
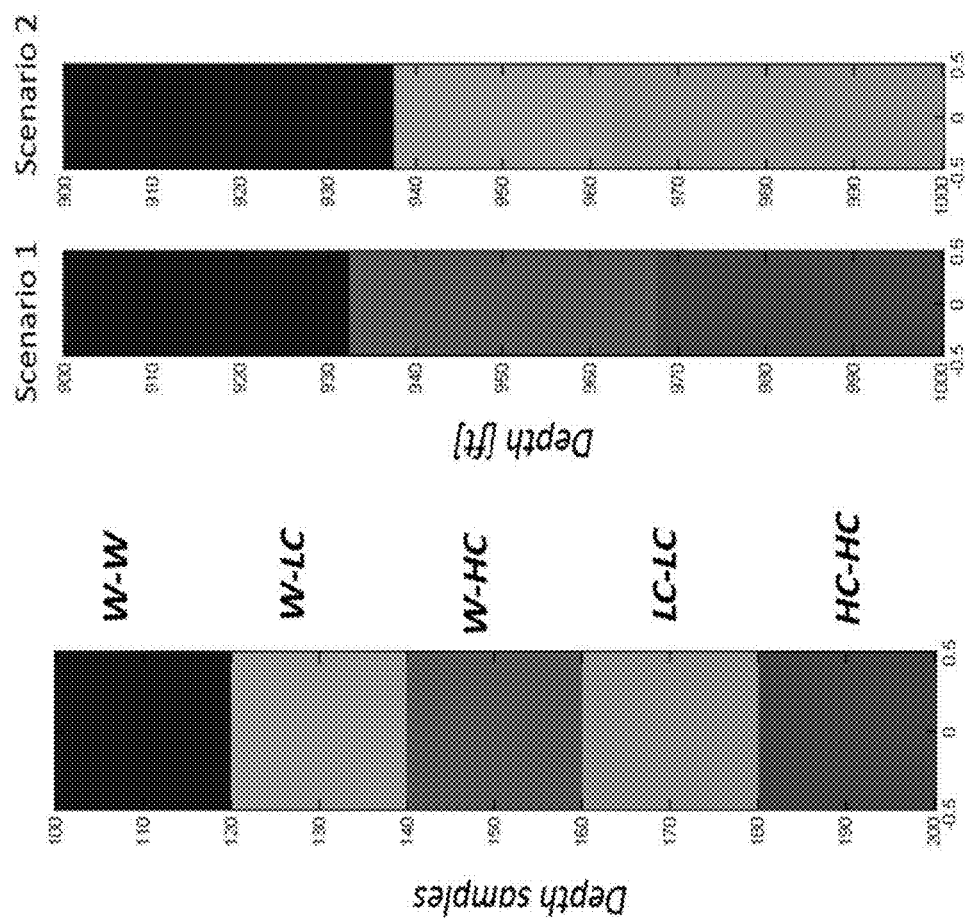
FIG. 4 depicts a synthetic dataset showing a training set encompassing five possible cases of fill in annulus A and B on the left and two test set scenarios on the right for evaluating the classification performance of the algorithm.

The "ground truth" labels as a function of depth for the two scenarios of Table 2 are shown in FIG. 4. In the simulations, the formation can vary over a range of slownesses from 100-240 μs/ft to mimic typical bedding and variation in sub-surface formations.

Data Preprocessing

As previously indicated, the machine learning module is trained with a set of preprocessed acoustic information. Embodiments of data preprocessing that lead to the specification of the classification methods are described hereinafter.

Bandpass Filters

Compared to synthetic data sets, the real data usually contains some artifacts and noise and may not match the ideal conditions of the modeled data. To make classifiers more robust, and to mimic imperfect field data, data with added noise to the signal (e.g., SNR=1 dB, and SNR=10 dB) may be utilized.

Figures 6A, 6B:
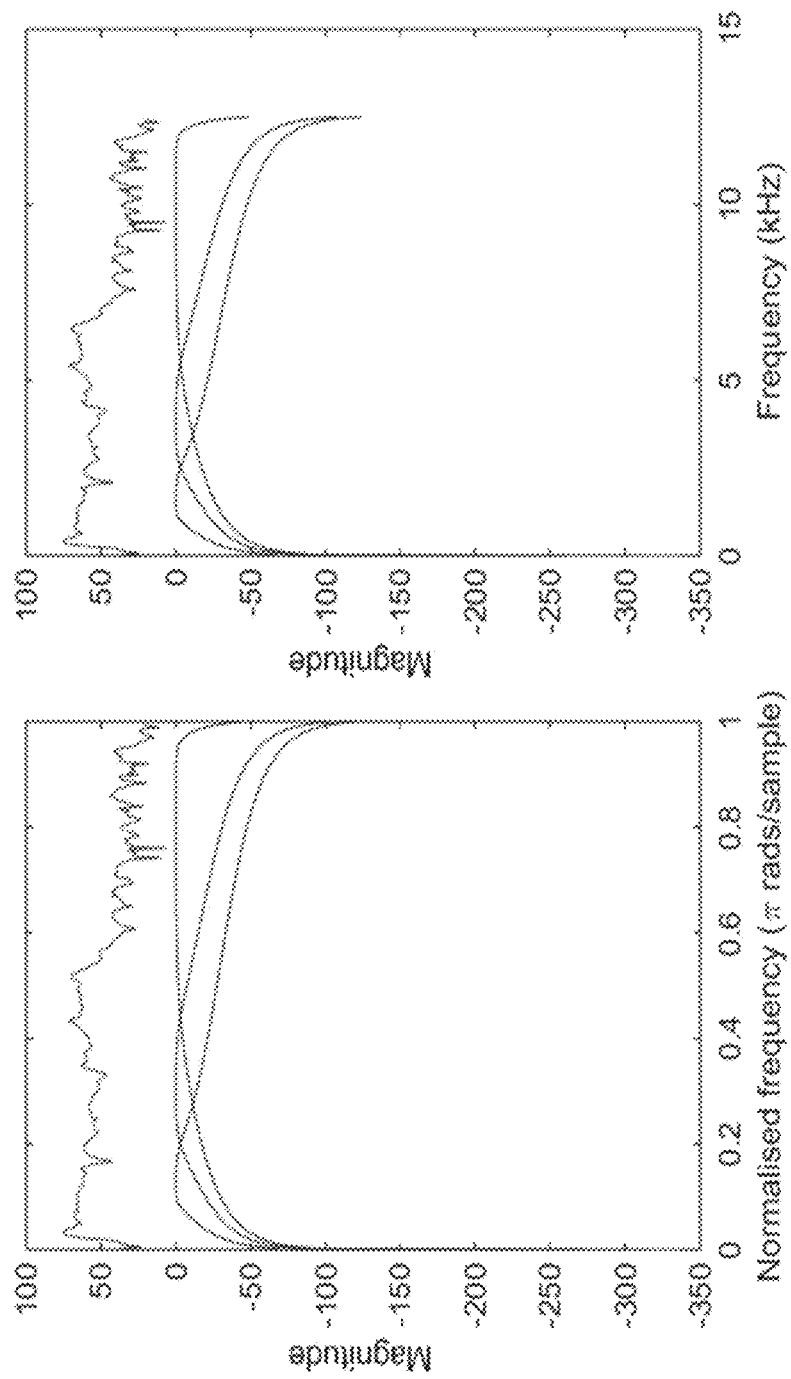
FIGS. 6a and 6b respectively depict Butterworth filters (bands) with different cutoff frequencies on a normalized frequency scale and on an original frequency scale.

To account for the richness of modes seen in the field data, bandpass filters are optionally used at 102 of FIG. 1 to preprocess the waveforms. In one embodiment, Butterworth filters are used for preprocessing: for monopole data, Butterworth filters with two bands are used, with bands picked as [1,5] kHz, and [5,12] kHz; and for dipole data, three frequency bands are used, namely: [1,2.5] kHz, [2.5,5.5] kHz, and [5.5,12] kHz respectively. The plots of the Butterworth filters are illustrated in FIGS. 6a and 6b showing three Butterworth filters with different cutoff frequencies on the normalized frequency scale in FIG. 6a and on the original frequency scale in FIG. 6b.

STC 2D Images

One manner of (pre-)processing the acoustic array data (at 102) is the slowness time coherence (STC) approach described in co-owned C. V. Kimball and T. L. Marzetta, "Semblance processing of borehole acoustic array data," *Geophysics* Vol. 49, No. 3, (March 1984) pp. 274-281; U.S. Pat. No. 4,594,691 to Kimball et al., entitled "Sonic Well Logging", and S. Bose, et al., "Semblance criterion modification to incorporate signal energy threshold," *SEG Annual Meeting* (2009), each of which is hereby incorporated by reference herein in its entirety. Although this approach is normally used in dispersive waves, for non-dispersive waves, it can be processed non-dispersively by bandpass filtering the data via multiple frequency bands. See, V. Rama Rao and M. N. Toksoz, "Dispersive wave analysis—method and applications," *Earth Resources Laboratory Industry Consortia Annual Report, MIT*, 2005, which is hereby incorporated by reference herein in its entirety. Thus, STC processing may still be used after bandpass filtering.

Standard STC processing generally involves taking the data of a multi-receiver sonic tool, stacking the moveout-corrected receiver outputs by depth level and identifying selected peaks of a coherence measure of the result, and producing logs of sonic properties of the formation versus borehole depth on the basis of selected parameters of the peaks. More particularly, the generation of STC 2D images is explained in detail in the previously incorporated publications to Kimball et al., and to S. Bose et al. Examples of STC 2D images are illustrated in the top portions of FIGS. 19-23, where the first row shows the STC 2D images from two different frequency bands of monopole data and from three different frequency bands of dipole data. In FIGS. 19-23, the x axis denotes the slowness in μs/ft, while the y axis denotes the time in μs. The value of each pixel (typically represented by color or shade) is called "semblance".

STC 1D Projection

Figure 7A:
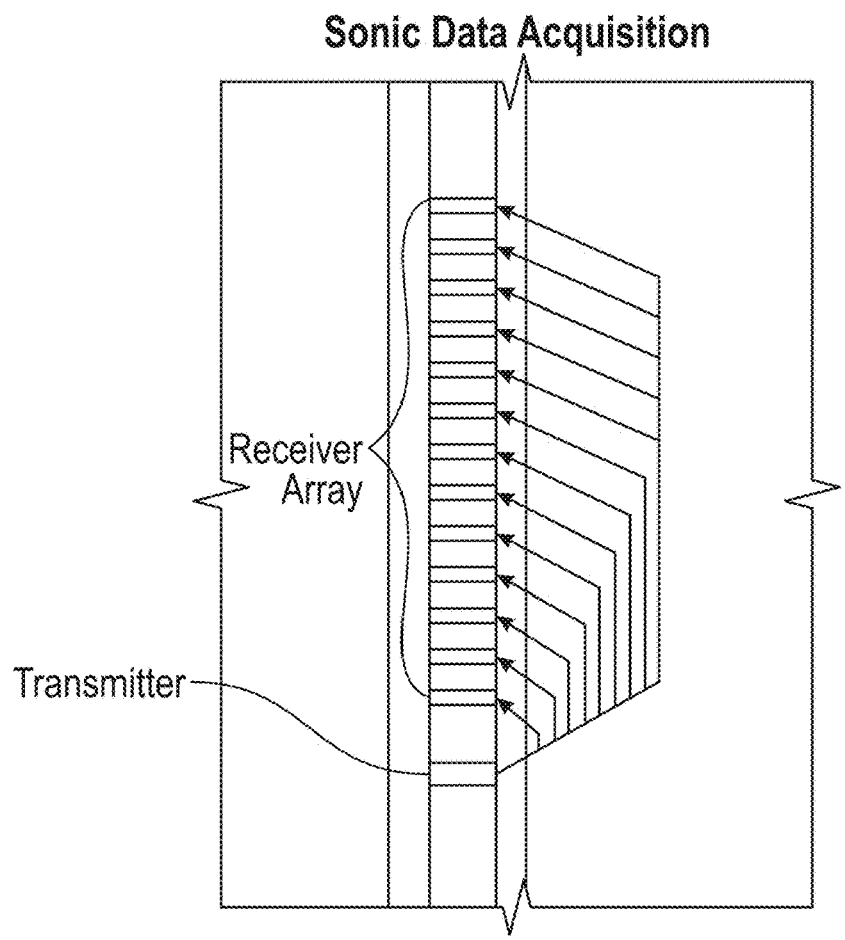
Figure 7B:
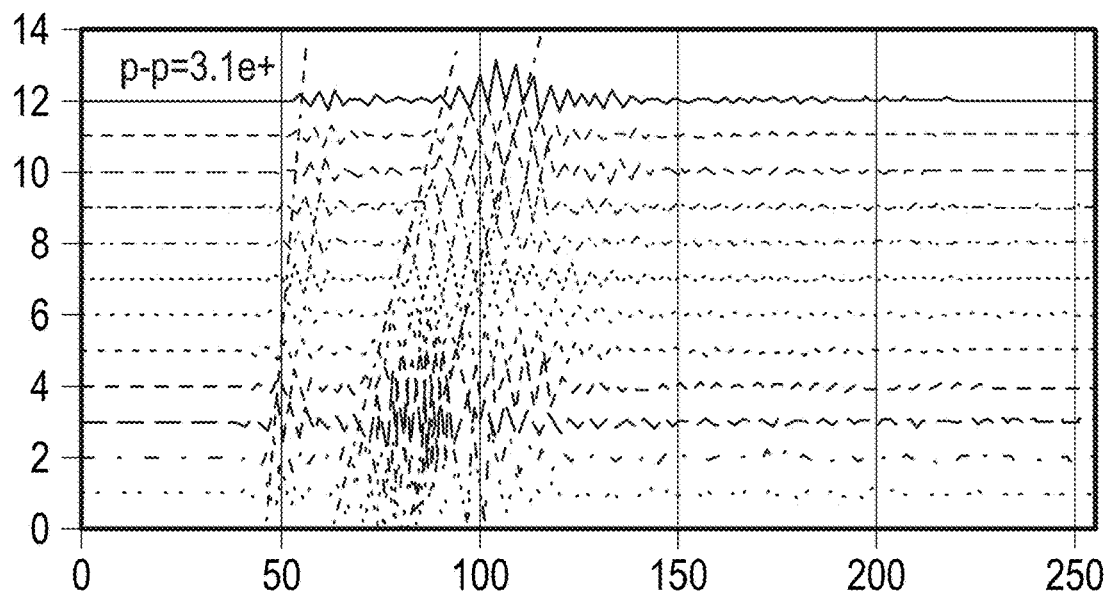

When using Support Vector Machines (SVM) for classification as described hereinafter, it may be useful to vectorize the STC 2D images. A straightforward way to vectorize the images is to project STC 2D images onto the slowness axis. All that is required is to choose a window representing primary arrivals for projection and compute the maximum value along the time axis for each slowness value and use them as a 1D vector. In FIG. 7a, a sonic tool is shown gathering data, plots of which are shown in FIG. 7b. An STC 2D image generated from the data of FIG. 7b is shown in FIG. 7c, with the projection window marked. An STC 1D vector generated from a projection of the STC 2D image of FIG. 7c is shown in FIG. 7d.

Radon Images and Projections

Radon transforms are closely related to standard STC transforms. In STC processing, all amplitude information is removed in favor of a normalized semblance which takes values between zero and one, whereas in Radon processing the amplitude information is retained. See, Radon, J. "On the Determination of Functions from their Integral Values Along Certain Manifolds", IEEE Transactions on Medical Imaging 5:4 pp. 170-176 (1986). Accordingly, standard STC processing may be called a normalized version of Radon processing, or conversely, Radon processing may be called a non-normalized version of standard STC processing. Therefore, for purposes of the specification and claims herein, the term "STC" is to be understood broadly to include Radon processing as well. For purposes of brevity, generally only the results of the normalized STC processing are set forth.

In embodiments, Radon transforms are used to obtain 2D ("non-normalized STC") maps (images) in one or more frequency bands. In other embodiments, the 2D maps obtained via Radon transforms may be projected to obtain a 1D non-normalized STC vector.

Labeling

In embodiments, each 2D (normalized or non-normalized) STC map (or corresponding STC 1D (normalized or non-normalized) vector projection) in the training set is assigned a label corresponding to the annular condition (scenario) in which the data was acquired for real data or for generated for synthetic data. Examples of such labels were previously described.

Classification Using Support Vector Machines

In machine learning, Support Vector Machine (SVM) is a supervised learning model with associated learning algorithms which analyze data used for binary class classification and regression. The present disclosure, however, deals with a multiclass classification problem. Thus, a strategy of one-to-all multiclass SVM may be utilized at 108. See, C.-W. Hsu and C.-J. Lin, "A comparison of methods for multiclass support vector machines." *IEEE Trans Neural Network*, Vol. 13, No. 2, pp. 415-425, (2002).

Assume a training set is available with l samples paired with their labels as: $(x_1,y_1), \ldots ,(x_l,y_l)$, where $x_i \in \{1, \ldots l\}$ are the training sets and $y_i \in \{1, \ldots, l\}$ are the labels. The m-th SVM solves the following problems:

$$\min_{w^m,b^m,\varepsilon^m} \frac{1}{2}(w^m)^T w^m + C\sum_{i=1}^{l} \varepsilon_i^m \qquad (1)$$

$$\text{s.t. } (w^m)^T \phi(x_i) + b^m \geq 1 - \varepsilon_i^m, \text{ if } y_i = m,$$

$$(w^m)^T \phi(x_i) + b^m \leq \varepsilon_i^m - 1, \text{ if } y_i \neq m,$$

$$\varepsilon_i^m \geq 0, i = 1, \ldots, l,$$

where the training data $x_i$ are mapped to a higher dimensional space by the function $\phi$, $w^m$ and $b^m$ are the SVM weight and bias coefficients respectively, $\varepsilon^m$ are margin coefficients in a penalty term $C\Sigma_{i=1}^{l}\varepsilon_i^m$ with a penalty parameter C and the superscript T represents the transposed quantity. The penalty term is used to address the general case when data is not linearly separable. The coefficients are estimated as part of the learning process by minimizing the expression in equation 1. After solving it, there are k possible decision functions: $(w^1)^T\phi(x)+b^1, \ldots ,(w^k)^T\phi(x)+b^k$. It may be said that x belongs to the class which has the largest value of the decision function:

$$\text{class of } (x) \equiv \underset{m=1,\ldots,k}{\text{argmax}}\left((w^m)^T\phi(x) + b^m\right) \qquad (2)$$

Full Frequency Band STC 2D and STC 1D Data Classification Using Support Vector Machine Classifier Various combinations of full frequency band monopole and dipole data used for training and testing are analyzed. For example, Table 3 provides a summary of the monopole data sets used for training and validation, while Table 5 provides a summary of the dipole data sets used for training and validation. The monopole data sets include: clean data (no noise added to the waveforms); and data with additive noise (SNR=1 dB, and SNR=10 dB). Data cubes 1:2:25 were used for training, and cubes 2:2:24 for validation. In Table 3, classification rate (averaged over all 5 labels) is reported on the cross-validation (CV) dataset. Additionally, included are examples where only one cube (with noisy or clean data) was used for training.

TABLE 3

Summary of monopole datasets used for training and validation.
Classification rate is computed on validation dataset.

MONOPOLE DATA

| Train/Model Dataset | Validation Dataset | Classification Rate on CV data |
|---|---|---|
| clean data | clean data | 1 |
| clean data | SNR1 | 0.2 |
| clean data | SNR10 | 0.2 |
| SNR1 | clean data | 0.945 |
| SNR1 | SNR1 | 0.735 |
| SNR1 | SNR10 | 1 |
| SNR10 | clean data | 0.8 |
| SNR10 | SNR1 | 0.9994 |
| SNR10 | SNR10 | 0.9917 |
| clean data, 1 cube | clean data | 1 |
| clean data, 1 cube | SNR1 | 0.2 |
| clean data, 1 cube | SNR10 | 0.2 |
| SNR1, 1 cube | clean data | 0.6372 |
| SNR1, 1 cube, | SNR1 | 0.9863 |
| SNR1, 1 cube | SNR10 | 0.9194 |
| SNR10, 1 cube | clean data | 0.5806 |
| SNR10, 1 cube | SNR1 | 0.6422 |
| SNR10, 1 cube | SNR10 | 1 |

The learned models are used to classify the unlabeled data for two scenarios of interests (Scenario 1, and Scenario 2), with ground truth labels designed as in Table 2. Classification rates corresponding to the two scenarios are provided in Table 4.

TABLE 4

Classification of two unlabeled monopole datasets (Scenario 1 and 2).
Classificationrate is computed based on ground truth labels from Table 2.

MONOPOLE DATA

| Model Dataset | Test set | Classification Rate | Test set | Classification Rate |
|---|---|---|---|---|
| clean data | scene 1, clean data | 1 | scene 2, clean data | 1 |
| clean data | scene 1, SNR1 | 0 | scene 2, SNR1 | 0.375 |
| clean data | scene 1, SNR10 | 0 | scene 2, SNR10 | 0.375 |
| SNR1 | scene 1, clean data | 1 | scene 2, clean data | 0.75 |
| SNR1 | scene 1, SNR1 | 1 | scene 2, SNR1 | 1 |
| SNR1 | scene 1, SNR10 | 1 | scene 2, SNR10 | 0.095 |
| SNR10 | scene 1, clean data | 1 | scene 2, clean data | 0.75 |
| SNR10 | scene 1, SNR1 | 1 | scene 2, SNR1 | 1 |
| SNR10 | scene 1, SNR10 | 1 | scene 2, SNR10 | 0.995 |
| clean data, 1 cube | scene 1, clean data | 1 | scene 2, clean data | 1 |
| clean data, 1 cube | scene 1, SNR1 | 0 | scene 2, SNR1 | 0.375 |
| clean data, 1 cube | scene 1, SNR10 | 0 | scene 2, SNR10 | 0.375 |
| SNR1, 1 cube | scene 1, clean data | 0.6750 | scene 2, clean data | 0.75 |
| SNR1, 1 cube, | scene 1, SNR1 | 0.98 | scene 2, SNR1 | 1 |
| SNR1, 1 cube | scene 1, SNR10 | 1 | scene 2, SNR10 | 0.86 |
| SNR10, 1 cube | scene 1, clean data | 0.62 | scene 2, clean data | 0.75 |
| SNR10, 1 cube | scene 1, SNR1 | 0.73 | scene 2, SNR1 | 0.775 |
| SNR10, 1 cube | scene 1, SNR10 | 1 | scene 2, SNR10 | 1 |

The same method is utilized with respect to the dipole source data, and report classification rates on cross-validation, and test set data are set forth in Tables 5 and 6.

Figure 8:
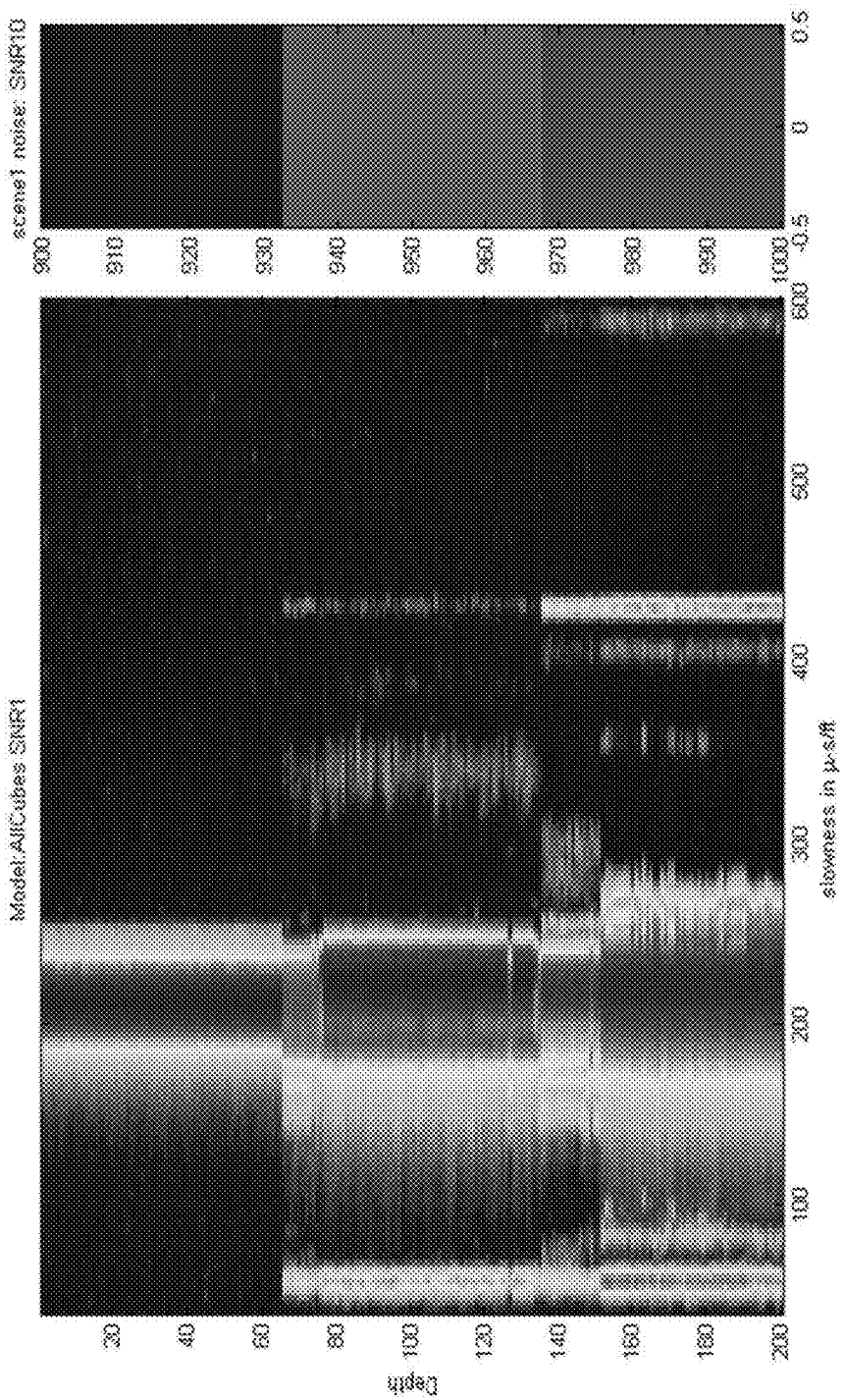
FIG. 8 is a classification result using SVM on unlabeled full frequency band monopole data (Scenario 1)
Figure 9:
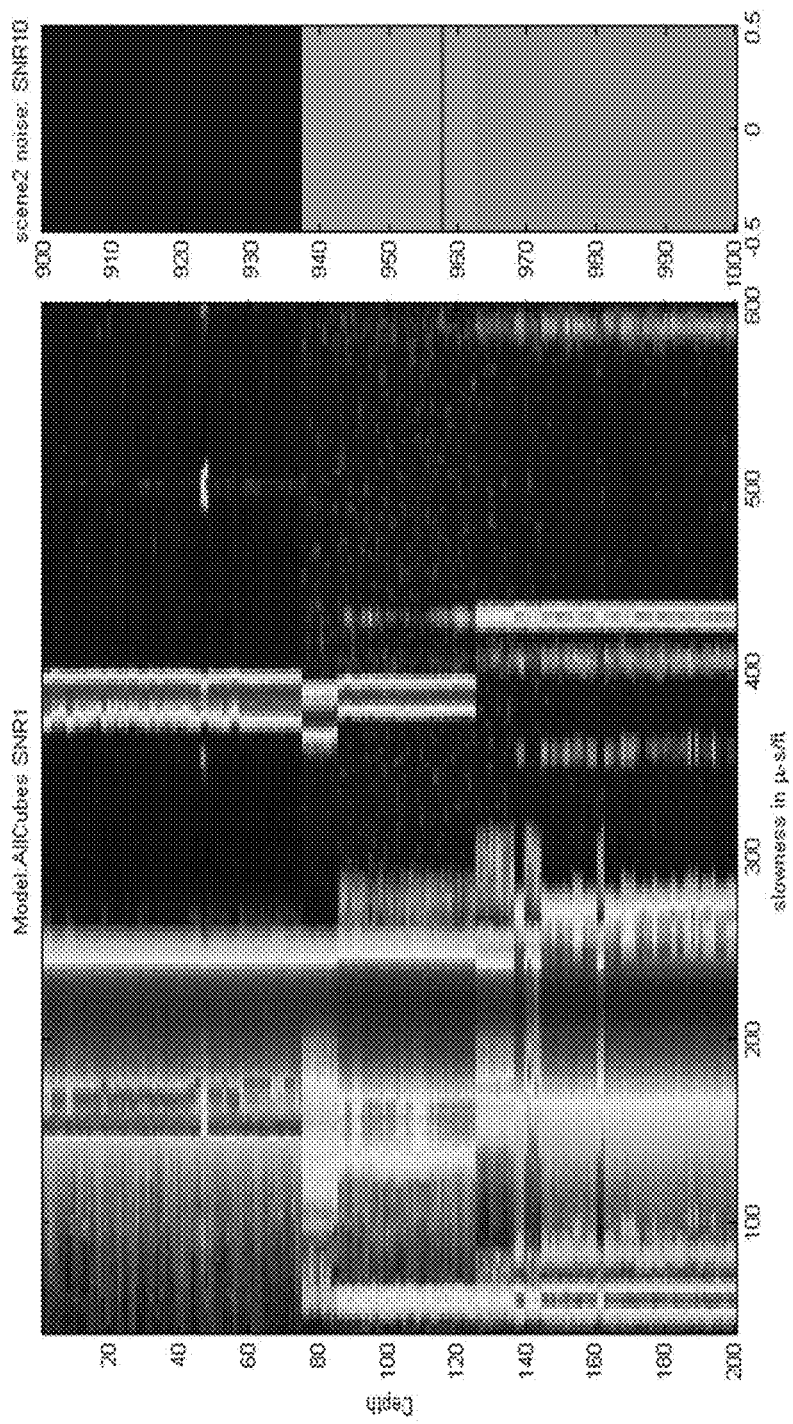
FIG. 9 is a classification result using SVM on unlabeled full frequency band monopole data (Scenario 2)
Figure 10:
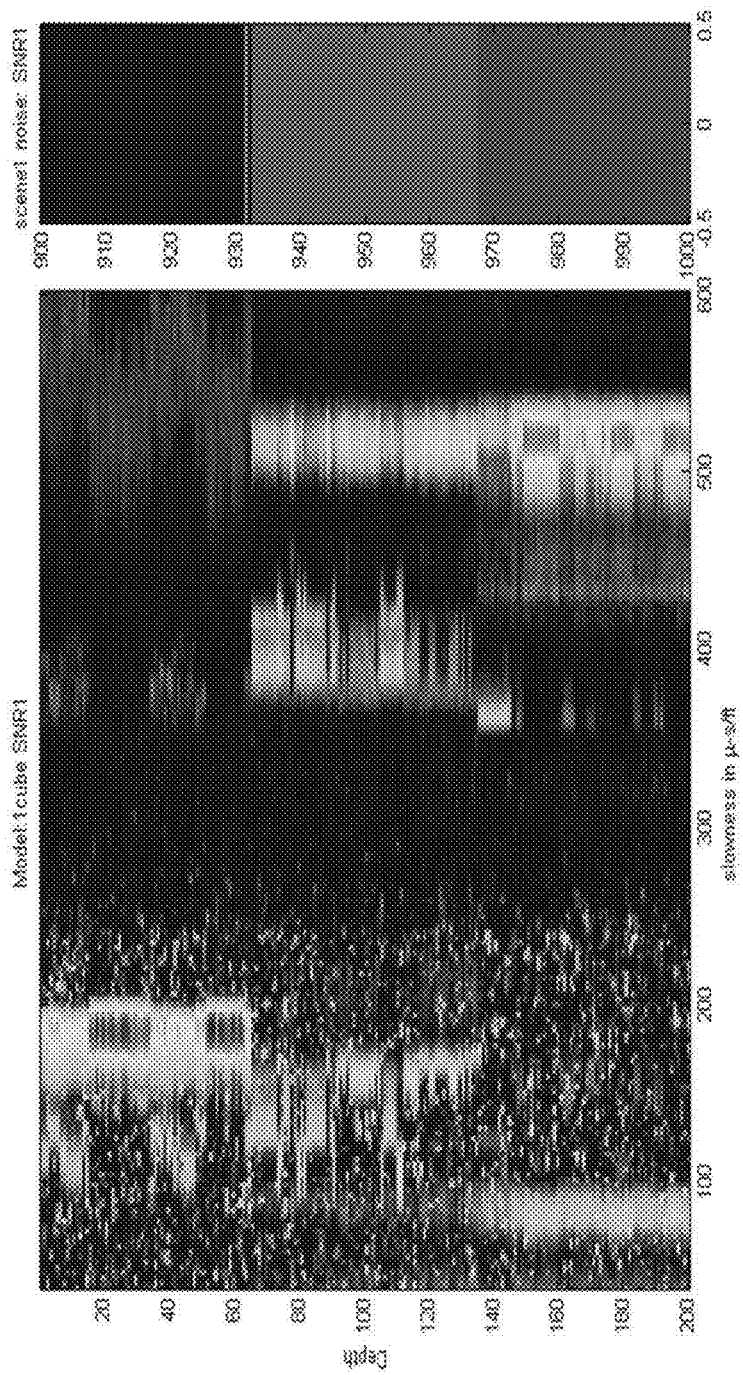
FIG. 10 is a classification result using SVM on unlabeled full frequency band dipole data (Scenario 1)
Figure 11:
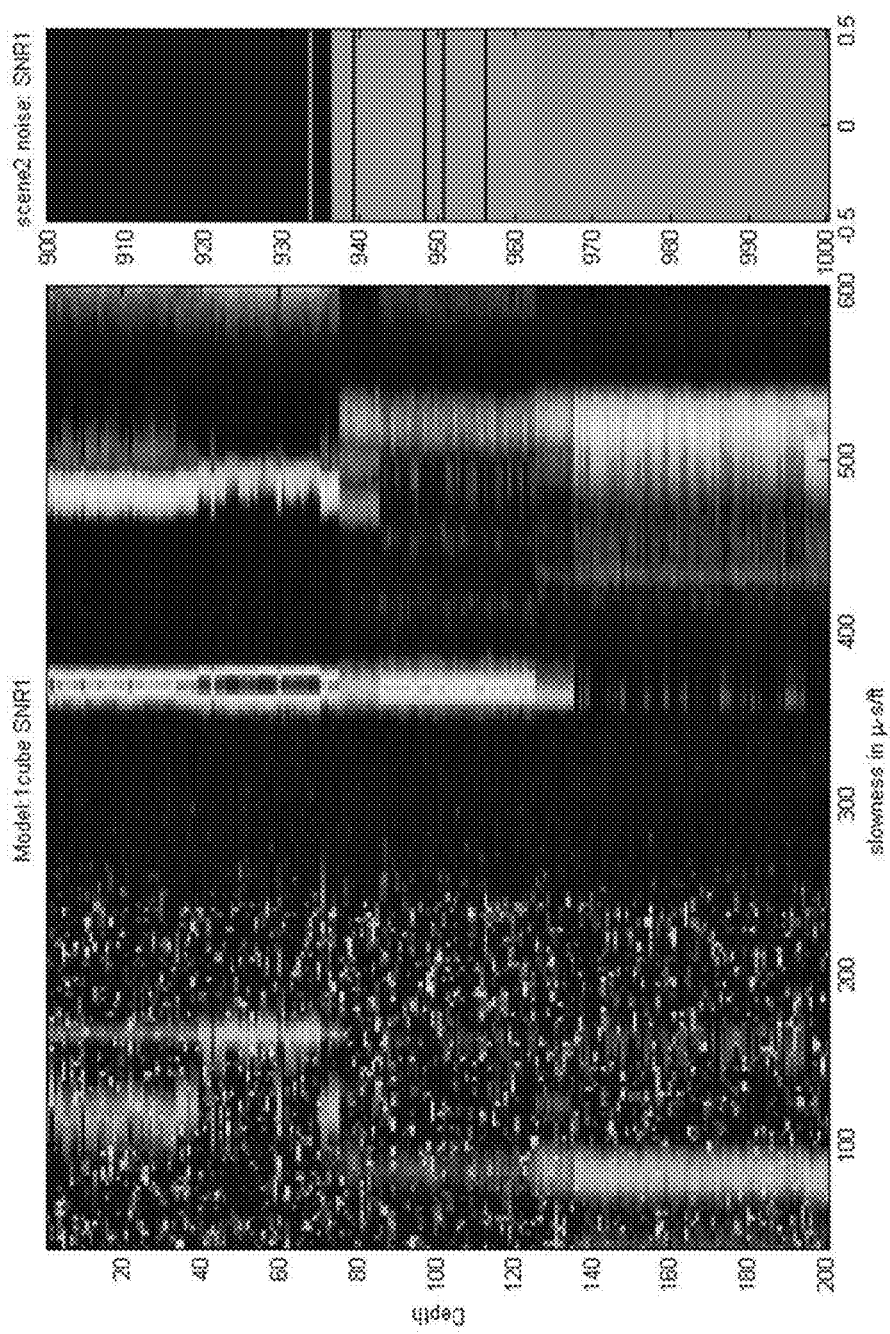
FIG. 11 is a classification result using SVM on unlabeled full frequency band dipole data (Scenario 2)

FIG. 8 is a classification result (map) using SVM on unlabeled full frequency band monopole data for Scenario 1 over a depth of interest. FIG. 9 is a classification result (map) using SVM on unlabeled full frequency band monopole data for Scenario 2 over a depth of interest. FIG. 10 is a classification result (map) using SVM on unlabeled full frequency band dipole data for Scenario 1 over a depth of interest. FIG. 11 is a classification result (map) using SVM on unlabeled full frequency band dipole data for Scenario 2 over a depth of interest.

TABLE 5

Summary of dipole datasets used for training and validation.
Classification rate is computed on validation dataset.

DIPOLE DATA

| Train/Model Dataset | Validation Dataset | Classification Rate on CV data |
|---|---|---|
| clean data | clean data | 1 |
| clean data | SNR1 | 0.4228 |
| SNR1 | clean data | 1 |
| SNR1 | SNR1 | 0.9983 |
| clean data, 1 cube | clean data | 1 |
| clean data, 1 cube | SNR1 | 0.4461 |
| SNR1, 1 cube | clean data | 0.9878 |
| SNR1, 1 cube | SNR1 | 0.9561 |

TABLE 6

Classification of two unlabeled dipole datasets (Scenario 1 and 2).
Classification rate is computed based
on ground truth labels from Table 2.

DIPOLE DATA

| Model Dataset | Test set | Classification Rate | Test set | Classification Rate |
|---|---|---|---|---|
| clean data | scene 1, clean data | 1 | scene 2, clean data | 1 |
| clean data | scene 1, SNR1 | 0.61 | scene 2, SNR1 | 0.39 |
| SNR1 | scene 1, clean data | 1 | scene 2, clean data | 1 |
| SNR1 | scene 1, SNR1 | 1 | scene 2, SNR1 | 1 |
| clean data, 1 cube | scene 1, clean data | 1 | scene 2, clean data | 1 |
| clean data, 1 cube | scene 1, SNR1 | 0.565 | scene 2, SNR1 | 0.315 |
| SNR1, 1 cube | scene 1, clean data | 1 | scene 2, clean data | 1 |
| SNR1, 1 cube, | scene 1, SNR1 | 0.995 | scene 2, SNR1 | 0.965 |

Multiband STC 2D and STC 1D Data Classification Using Support Vector Machines

In one aspect, classification results can be improved by using Butterworth filters. As previously mentioned, STC is a non-dispersive processing approach, so the data may be band-passed through multiple frequency bands such that the output of each band can be processed non-dispersively. Classification rates for each label of Scenario 1 and Scenario 2 are reported separately in Table 7.

Frequency ranges for monopole and dipole data may be selected as follows. For monopole data, Butterworth filters with two frequency bands are used: BPF1=[1,5] kHz, and BPF2=[5,12] kHz. For dipole data, three frequency bands are used; BPF1=[1,2.5] kHz, BPF2=[2.5,5.5] kHz, and BPF3=[5.5,12] kHz. Additionally, the data from monopole and dipole can be jointly combined within these frequency bands to enhance the SVM classifier (see Table 7).

TABLE 7

Classification results for CV dataset and Scenario 1 and Scenario 2 using multiband monopole and dipole data.

| Dataset | Classification Rate per Label (1-5) on CV Data | Classification Rate-Scene 1 | Classification Rate-Scene 2 |
| --- | --- | --- | --- |
| MONO BPF1 | 1, 1, 1, 1, 1 | 1 | 1 |
| MONO BPF2 | 1, 1, 1, 1, 1 | 1 | 1 |
| DIP BPF1 | 0.9867, 0.94, 0.9267, 0.76, 0.9867 | 0.92 | 0.97 |
| DIP BPF2 | 1, 1, 1, 1, 1 | 1 | 1 |
| DIP BPF3 | 1, 1, 1, 1, 1 | 1 | 1 |
| MONO BPF1-2 | 1, 1, 1, 1, 1 | 1 | 1 |
| DIP BPF 1-3 | 1, 1, 1, 1, 1 | 1 | 1 |
| MONO + DIP | 1, 1, 1, 1, 1 | 1 | 1 |

Data used for training falls in one of the groups of multiband data: for monopole source, BPF1 = [1, 5] kHz, and BPF2 = [5, 12] kHz, and for dipole data, three frequency bands are BPF1 = [1, 2.5] kHz, BPF2 = [2.5, 5.5] kHz, and BPF3 = [5.5, 12] kHz.

Figure 12:
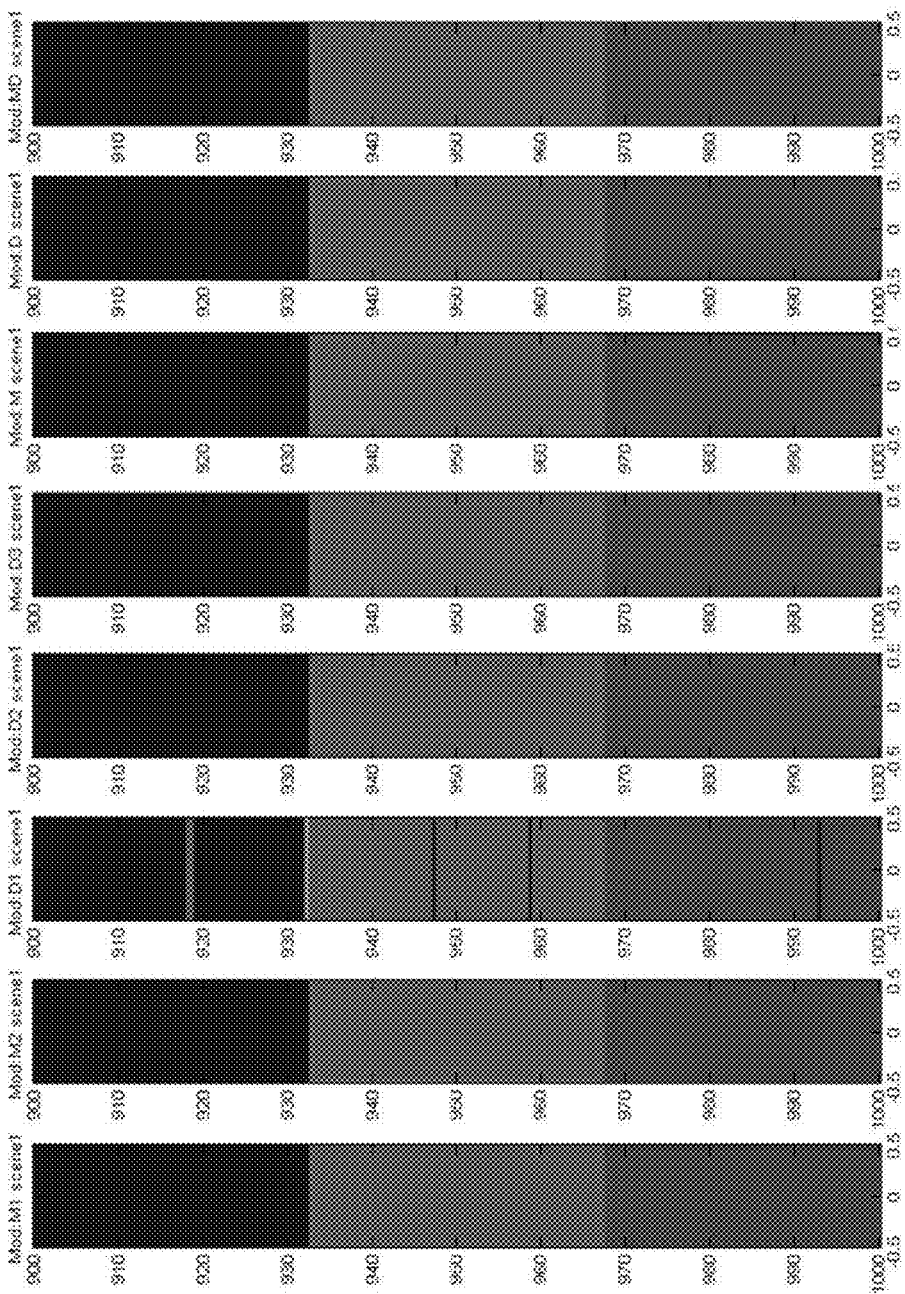
FIG. 12 is a classification result using SVM on unlabeled multiband data (Scenario 1) where M1, and M2 denote monopole data in frequency ranges BPF1, and BPF2; D1, D2, D3, denote dipole data in frequency ranges BPF1, BPF2, and BPF3; M denotes combined monopole frequency bands; D denotes combined dipole frequency bands, and MD denotes combined monopole and dipole frequency bands.
Figure 13:
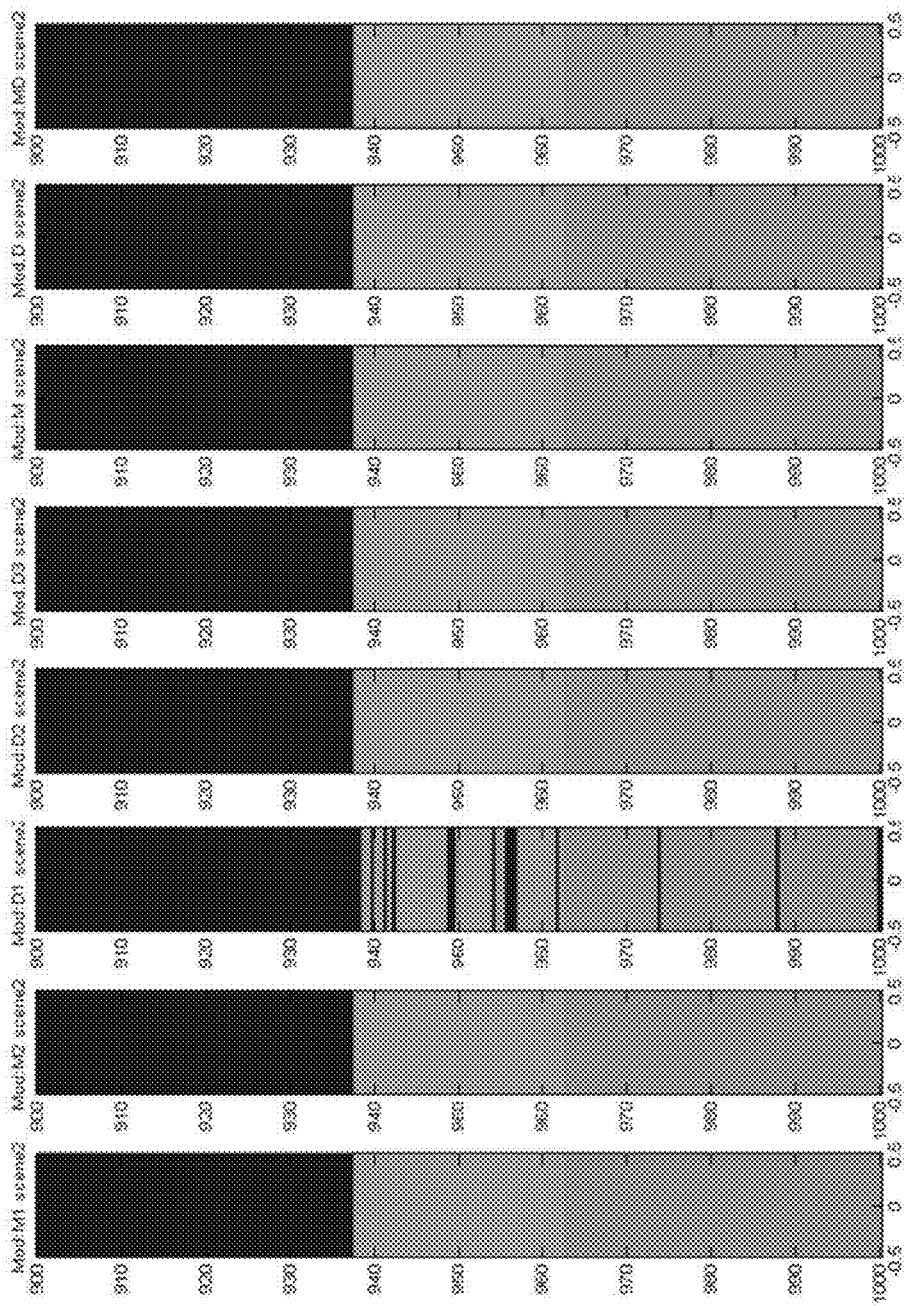
FIG. 13 is a classification result using SVM on unlabeled multiband data (Scenario 2) where M1, and M2 denote monopole data in frequency ranges BPF1, and BPF2; D1, D2, D3, denote dipole data in frequency ranges BPF1, BPF2, and BPF3; M denotes combined monopole frequency bands; D denotes combined dipole frequency bands, and MD denotes combined monopole and dipole frequency bands.

FIGS. 12 and 13 show classification maps over the depth interval of interest. More particularly, FIG. 12 shows classification results using monopole bandpass filter 1 (MONO BPF1) (e.g., STC-1D) data (panel 1), monopole BPF2 data (panel 2), dipole BPF1 data (panel 3), monopole BPF2 data (panel 4), monopole BPF3 data (panel), all monopole bands (MONO BPF1-2) (panel 6), all dipole bands (DIP BPF1-3) (panel 7), and all monopole and dipole bands (panel 8), all for Scenario 1. Similarly, FIG. 13 shows classification results using monopole BPF1 data (panel 1), monopole BPF2 data (panel 2), dipole BPF1 data (panel 3), monopole BPF2 data (panel 4), monopole BPF3 data (panel), all monopole bands (MONO BPF1-2) (panel 6), all dipole bands (DIP BPF1-3) (panel 7), and all monopole and dipole bands (panel 8), all for Scenario 2.

Feature Extractors

According to embodiments, feature extractors such as auto-encoders and Mel-Frequency Cepstral Coefficients (MFCC) may be used in combination with Support Vector Machines for classification.

Auto-Encoders

An auto-encoder is an artificial neural network for learning efficient representations. It consists of two parts: an encoder and a decoder. See, e.g., F. Chollet, "Building autoencoders in keras," in *The Keras Blog* (2016). Because massive training datasets are not necessarily being utilized, an auto-encoder will be designed using all the datasets available (the test sets and the training sets) for learning better features.

The mappings of the encoder and decoder are defined as:
$\phi: x \rightarrow \rho$ and $\psi: \rho \rightarrow x$.

The features $\rho$ generated from the auto encoder are called bottleneck features which will also be sent to the decoder for reconstruction. Then, all that is required is to find the parameters for the following optimization problem:

$$(\hat{\phi}, \hat{\psi}) = \underset{\phi, \psi}{\arg\min} \| X - (\psi \circ \phi) X \|_2^2 \quad (3)$$

Figure 14:
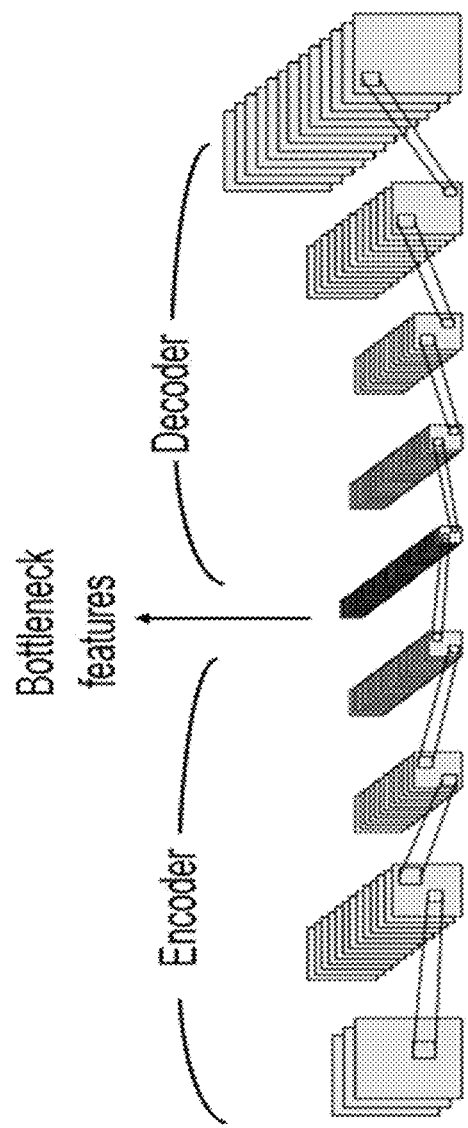
FIG. 14 is a schematic of a convolutional auto-encoder.

The goal of the auto-encoder is to learn a representation (coding) from a data set and is also used for dimensionality reduction. While a principal component analysis (PCA) can only have linear mappings, auto-encoders can have nonlinear encodings as well. Unlike PCA, auto-encoders can be easily extended as a stacked PCA. Some auto-encoder variations include an denoising auto-encoder, a sparse auto-encoder, a variational Bayes auto-encoder and a convolutional auto-encoder. In FIG. 14, a convolutional auto-encoder is illustrated with only convolutional and pooling layers and without the fully connected layers.

Figure 15:
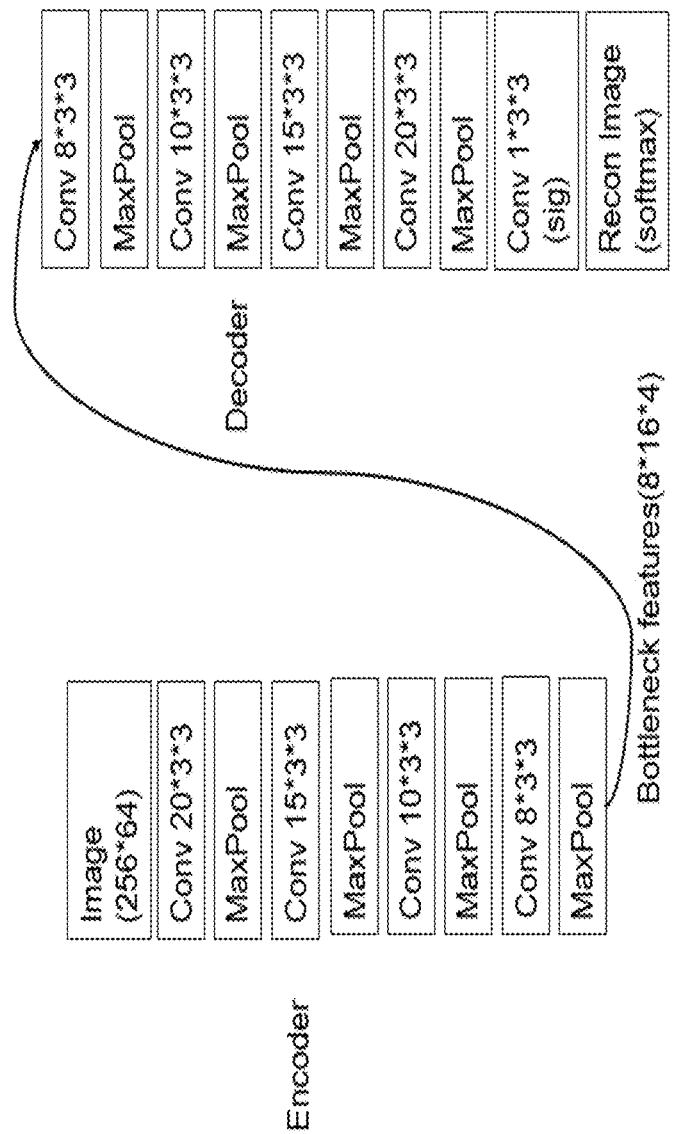
FIG. 15 depicts parameters of the auto-encoder of FIG. 14.
Figure 16:
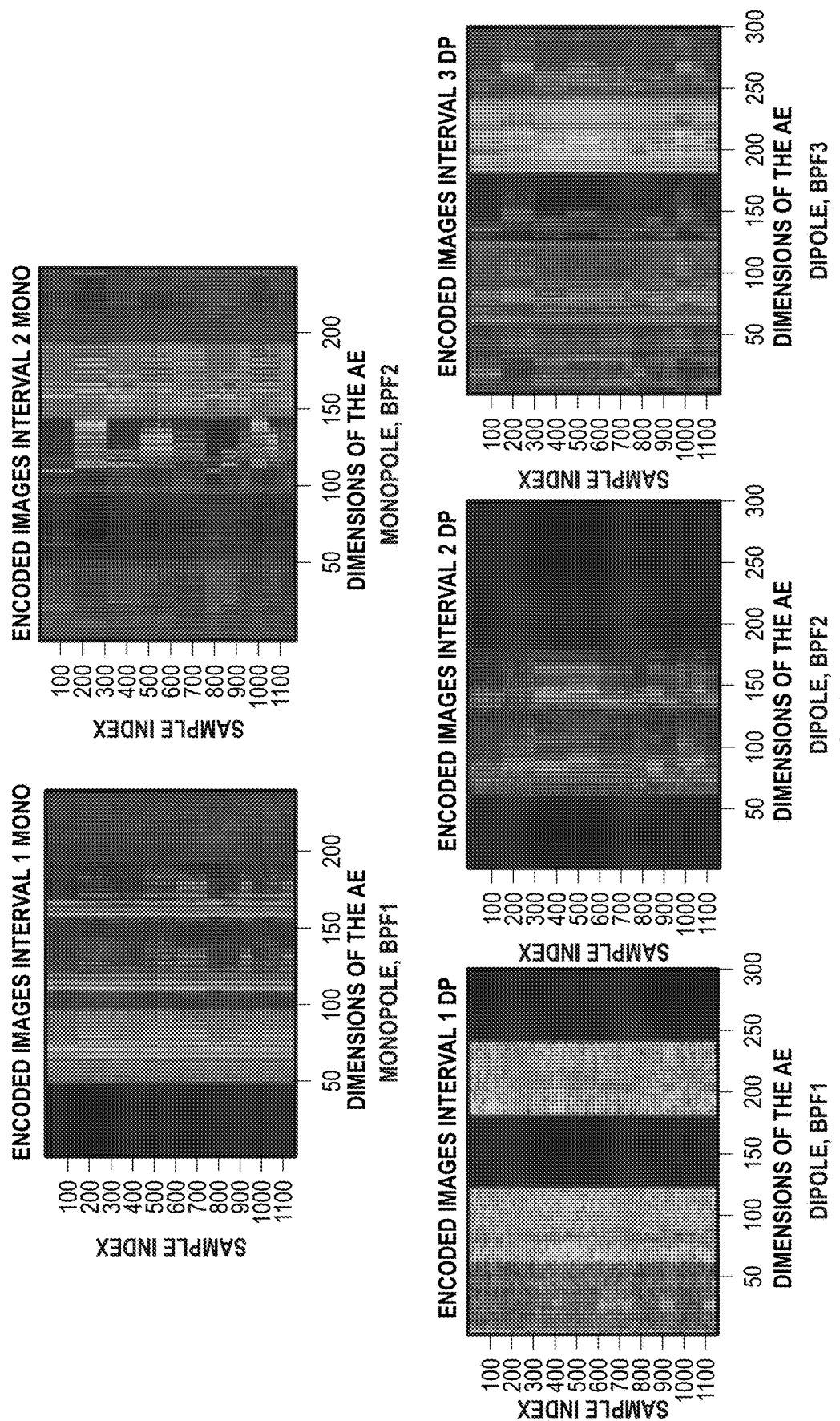
FIGS. 16a-16e show learned bottleneck features with the x-axis being the pixel index of the bottleneck feature, and the y-axis representing the training set index.

The parameters of the auto-encoder of FIG. 14 (starting from an image) are shown on FIG. 15, and the dimension of the bottleneck features can be tuned by using a different number of (max)pooling layers, where the maximum value of the values of pixels within a window is used to represent the window. If a decrease in dimension is desired, more pooling layers are required.

FIGS. 16a-16e show learned bottleneck features for monopole bandpass filter 1 (BPF1) (for STC-2D) data, monopole BPF2 data, dipole BPF1 data, dipole BPF2 data, and dipole BPF3 data respectively, with the x-axis being the pixel index of the bottleneck feature, and the y-axis representing the training set index.

Figure 17:
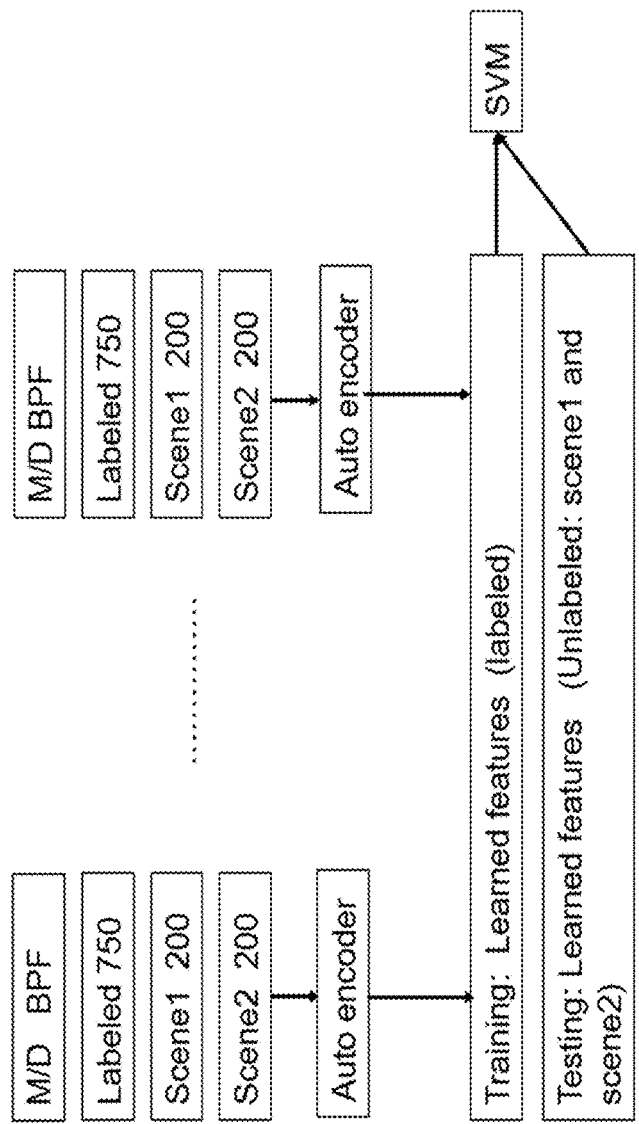
FIG. 17 is a training/testing diagram of auto-encoder with SVM.
Figure 18:
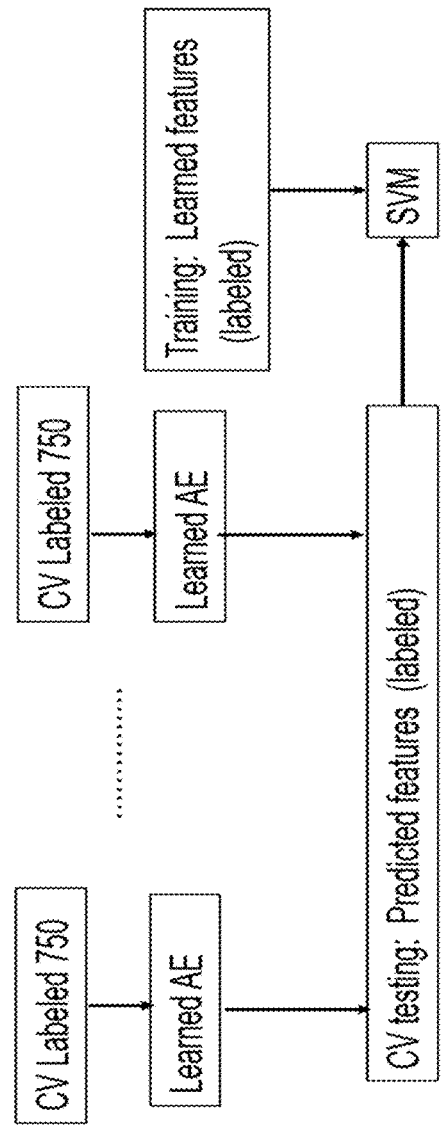
FIG. 18 is a cross validation diagram of auto-encoder with SVM.

In one embodiment, auto-encoding followed by SVM is utilized for training at 108 of FIG. 1. This combination falls into the class of semi-supervised learning methods. FIG. 17 shows a diagram for training and testing, and FIG. 18 shows a diagram for cross-validation. As seen in FIG. 17, the features are learned from the labeled data as well as the unlabeled scenario data. To increase the number of samples, all the unlabeled data sets are also used as the input to the auto encoder in the training step. More particularly, FIG. 17 shows an illustration of the step for an example where the STC-2D maps for all the 750 samples in the training set along with the 200 samples each from scenario 1 and 2 are fed from the testing set to the auto-encoder to arrive at a much lower dimensional learned feature set. This process is repeated for each of the bandpass filtered STC maps for monopole and dipole data. The learned features of the bands and modes are then jointly fed into an SVM which is trained and cross-validated using the labels from the training set as shown in FIG. 18. The trained SVM can now be applied to the features extracted from the testing set to complete the classification.

Figure 19:
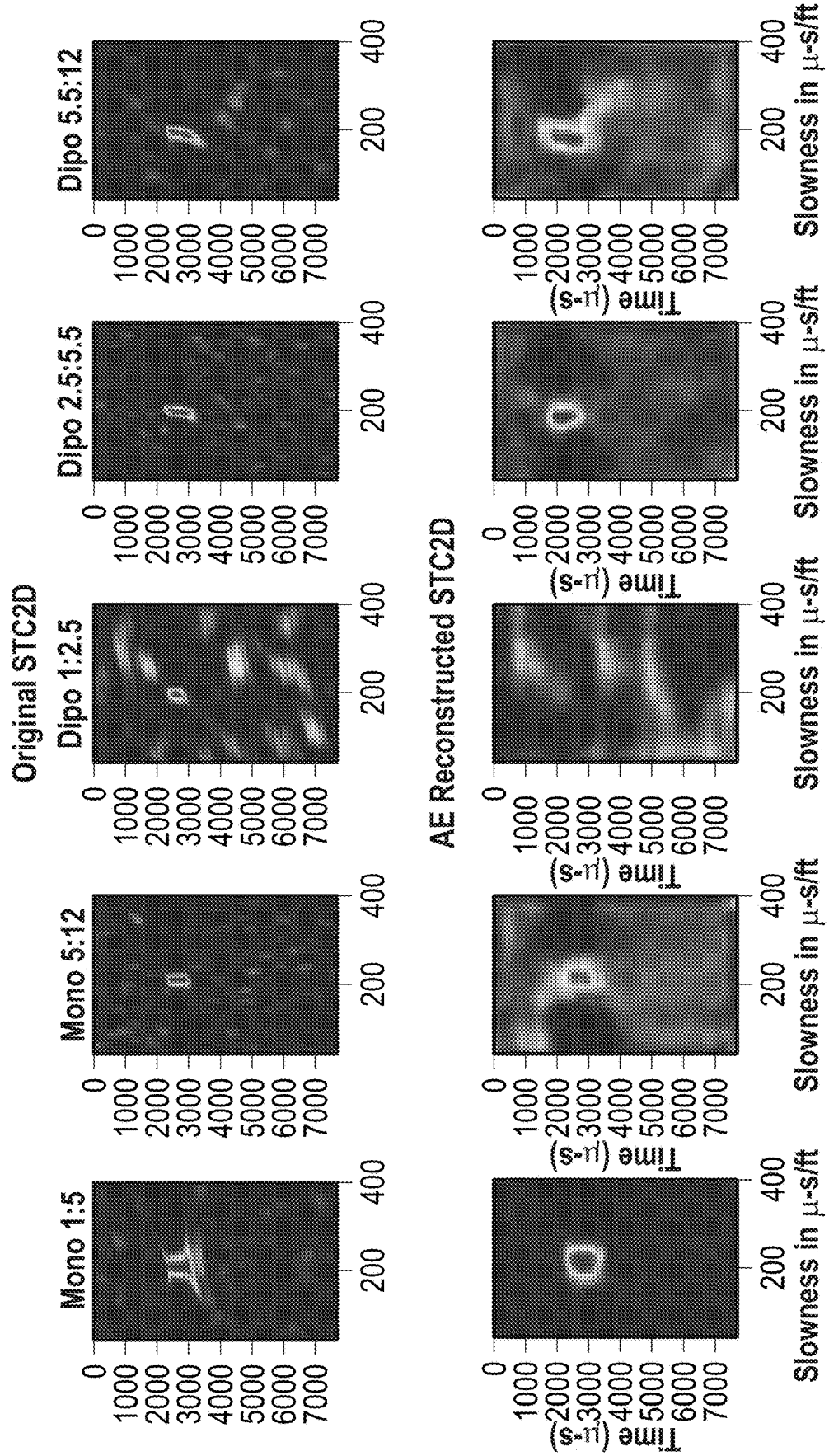
FIG. 19 shows original and reconstructed STC 2D images for label 1 (Cubes 1 through 250) for Cube #25.
Figure 20:
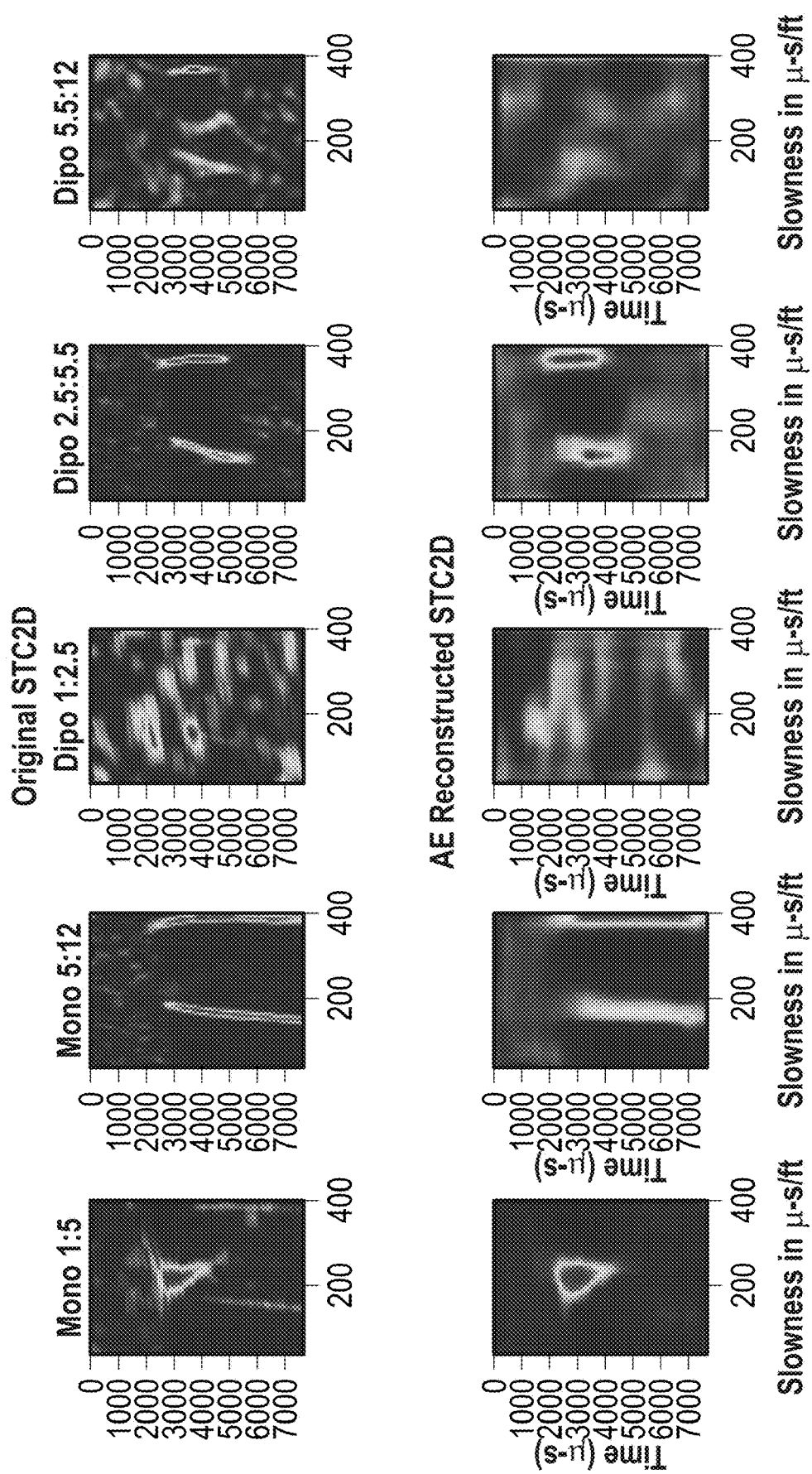
FIG. 20 shows original and reconstructed STC 2D images for label 2 (Cubes 151-300) for Cube #201.
Figure 21:
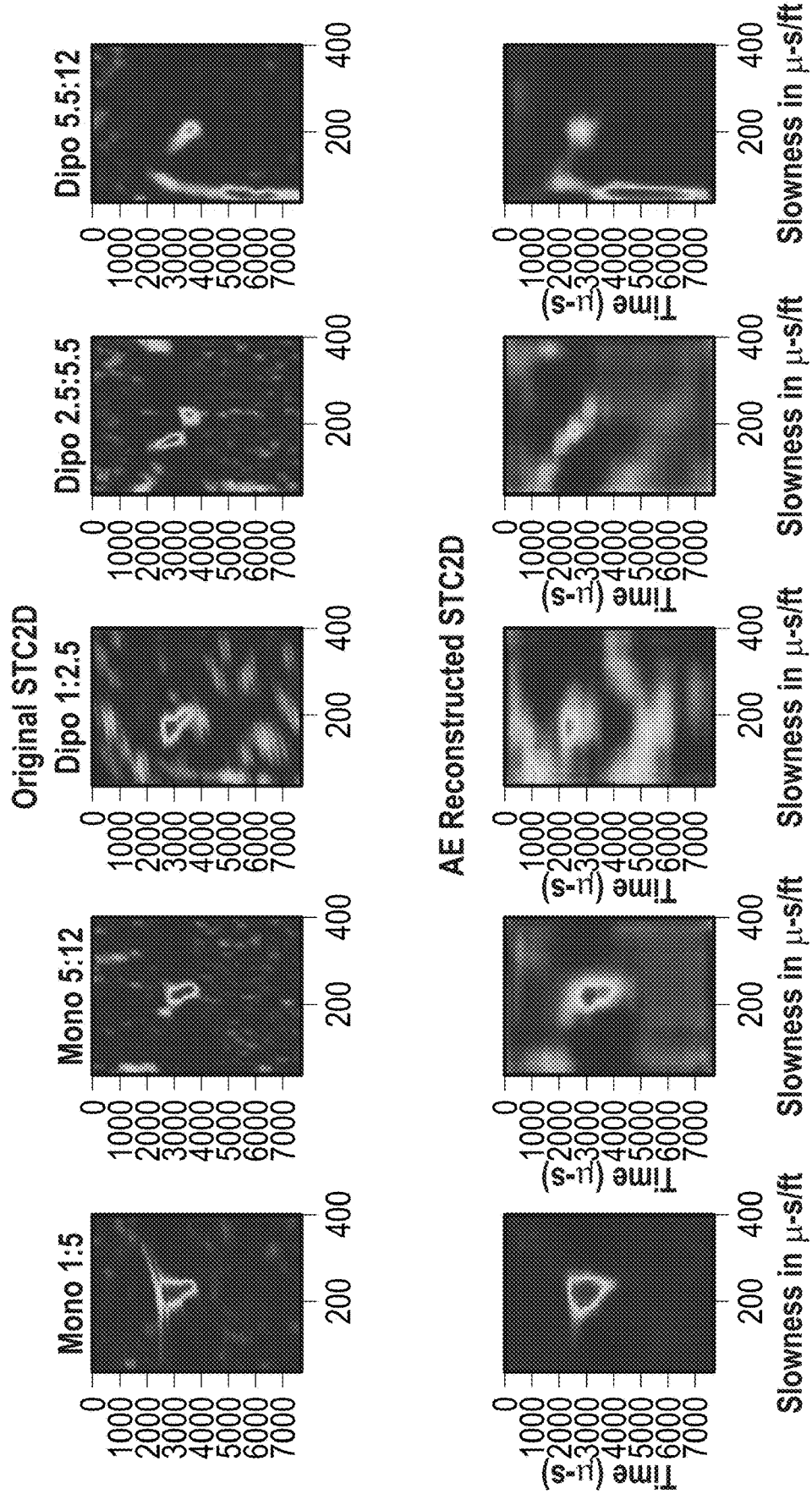
FIG. 21 shows original and reconstructed STC 2D images for label 3 (Cubes 301-450) for Cube #325.
Figure 22:
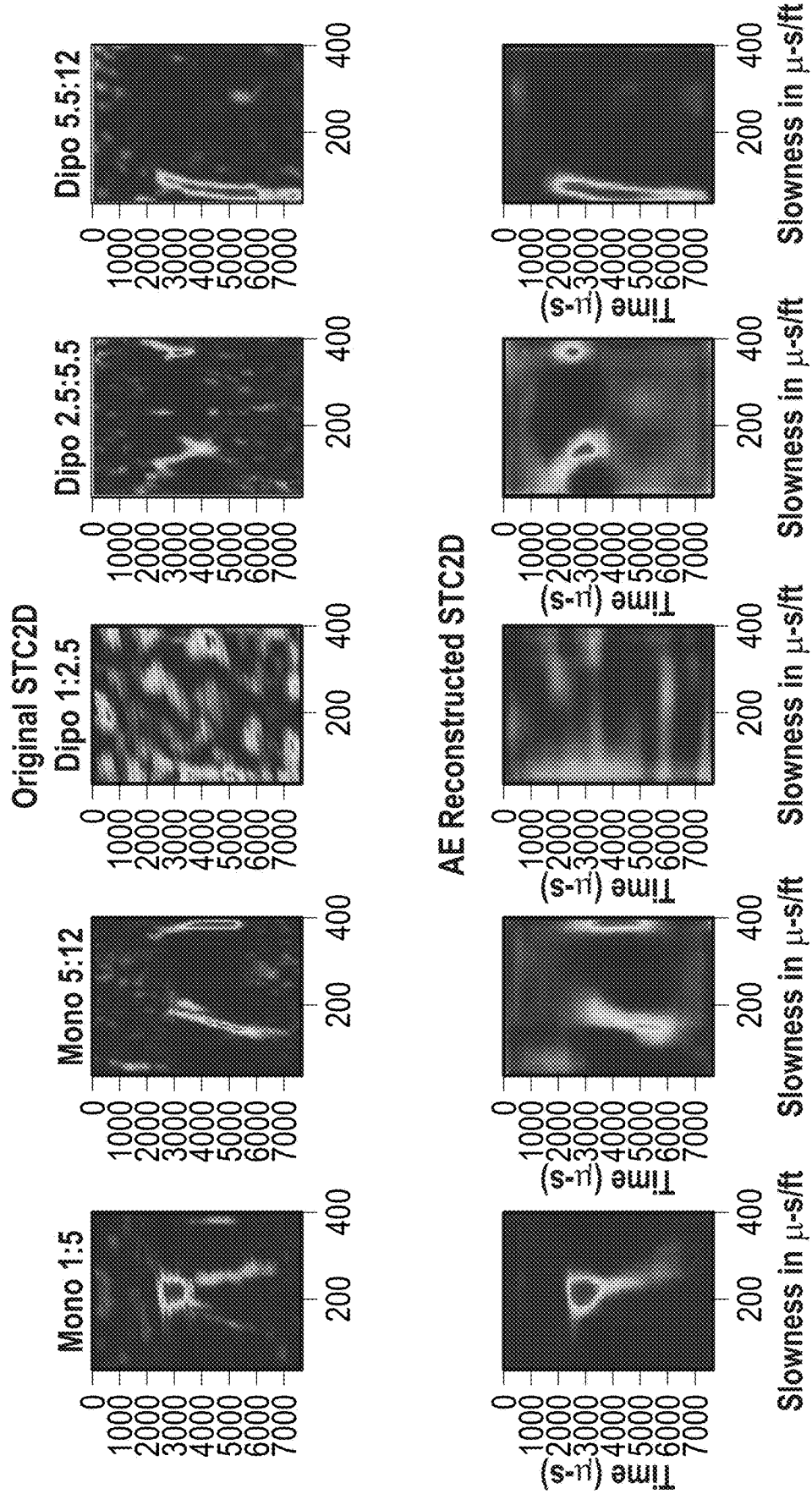
FIG. 22 shows original and reconstructed STC 2D images for label 4 (Cubes 451-600) for Cube #476.
Figure 23:
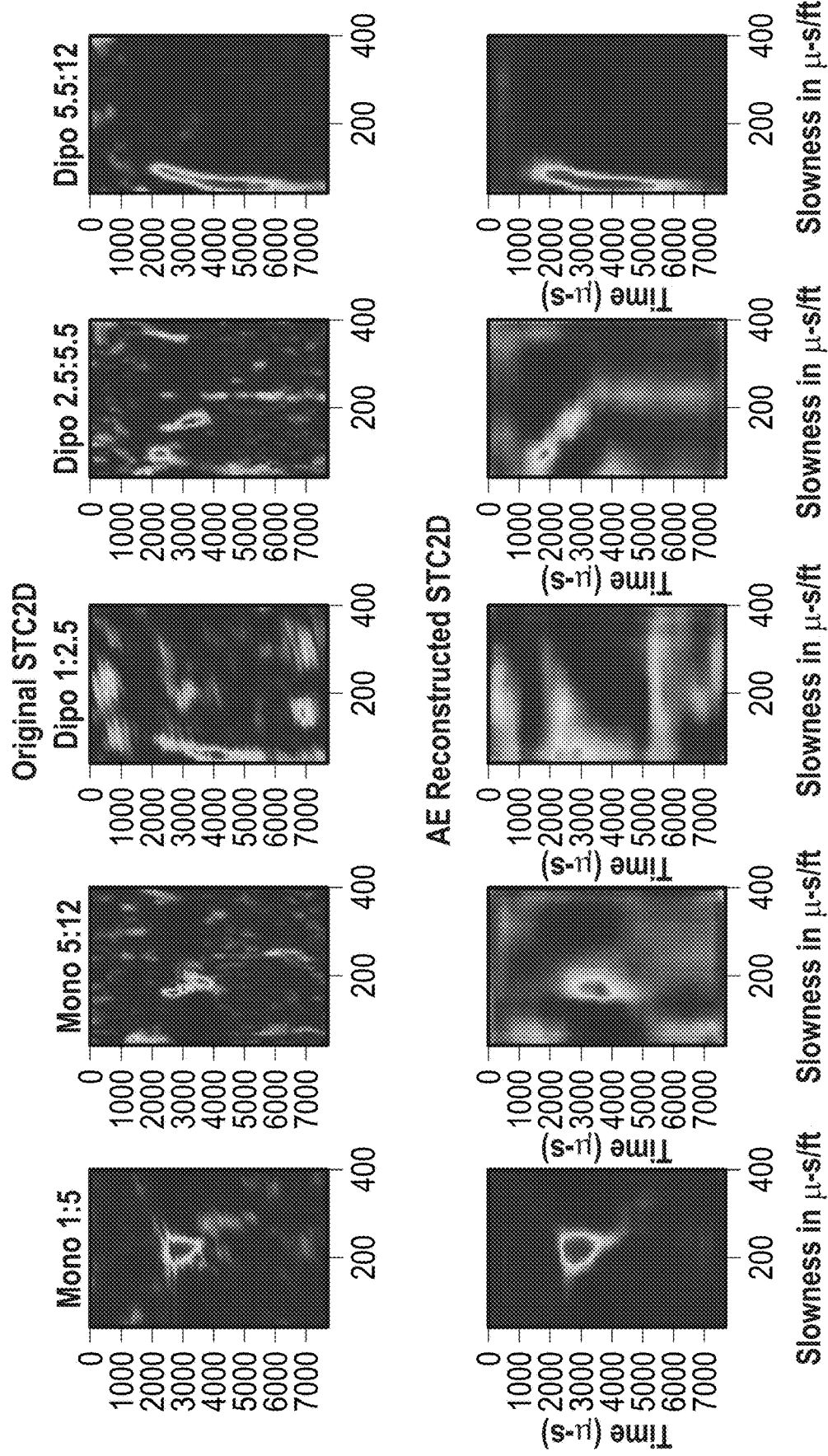
FIG. 23 shows original and reconstructed STC 2D images for label 5 (Cubes 601-750) for Cube #667.

FIGS. 19-23 show examples of initial (original) and the reconstructed STC 2D images for the two different monopole bands and three different dipole bands generated by the convolutional auto-encoder of FIG. 15. Thus, FIG. 19 shows the original and reconstructed images for label one of a first cube; FIG. 20 shows the original and reconstructed images for label two of a second cube; FIG. 21 shows the original and reconstructed images for label three of a third cube; FIG. 22 shows the original and reconstructed images for label four of a fourth cube; and FIG. 23 shows the original and reconstructed images for label five of a fifth cube. It will be appreciated that for some purposes, the reconstructed images are reasonable representations of the original images.

Figure 24:
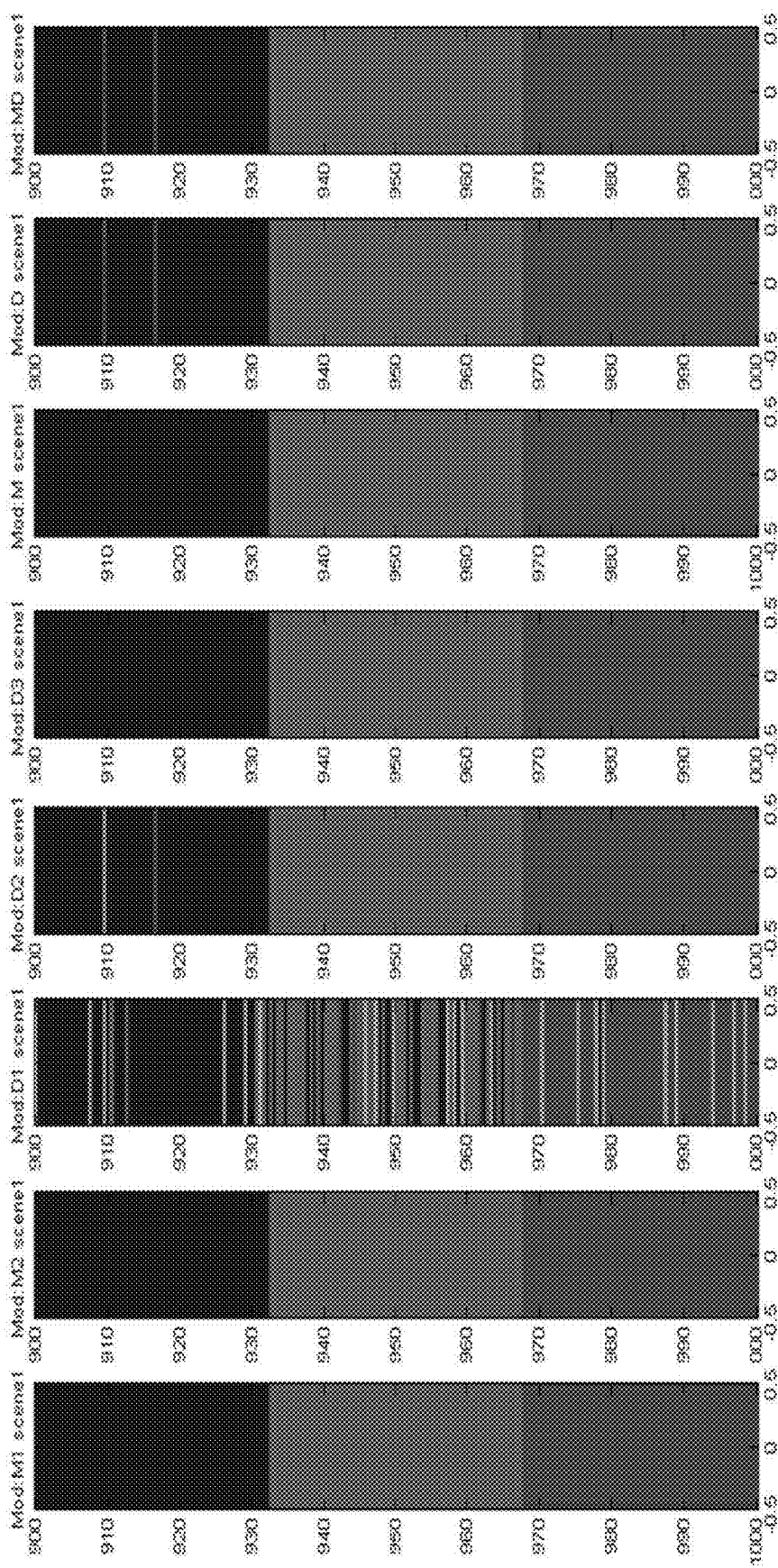
FIG. 24 shows a classification result using auto-encoding plus SVM (AE+SVM) on unlabeled multiband multimodality data (Scenario 1) where the data used is as given on FIG. 12.
Figure 25:
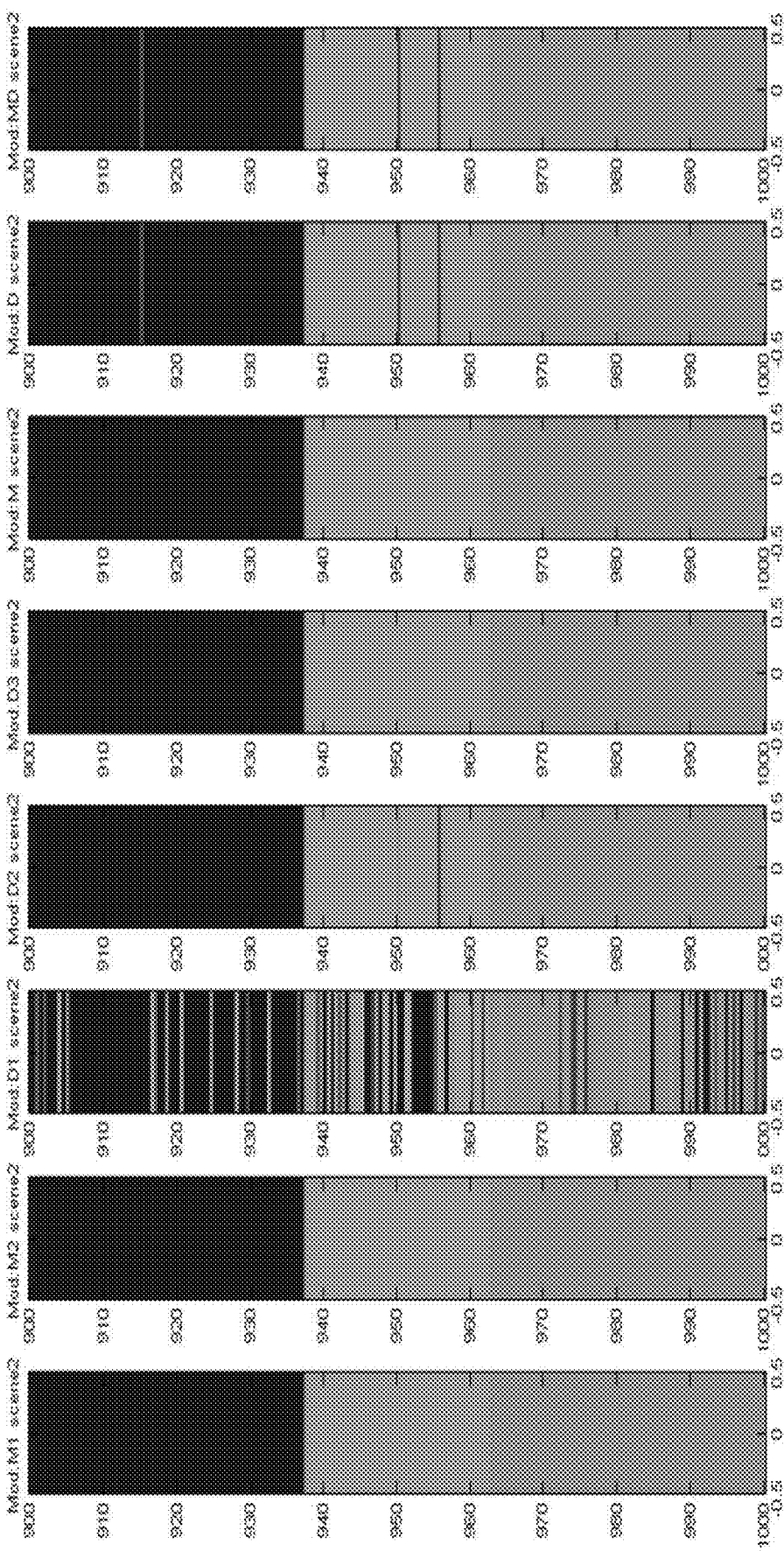
FIG. 25 shows a classification result using AE+SVM on unlabeled multiband multimodality data (Scenario 2) where the data used is as given on FIG. 13.
Figure 26A:
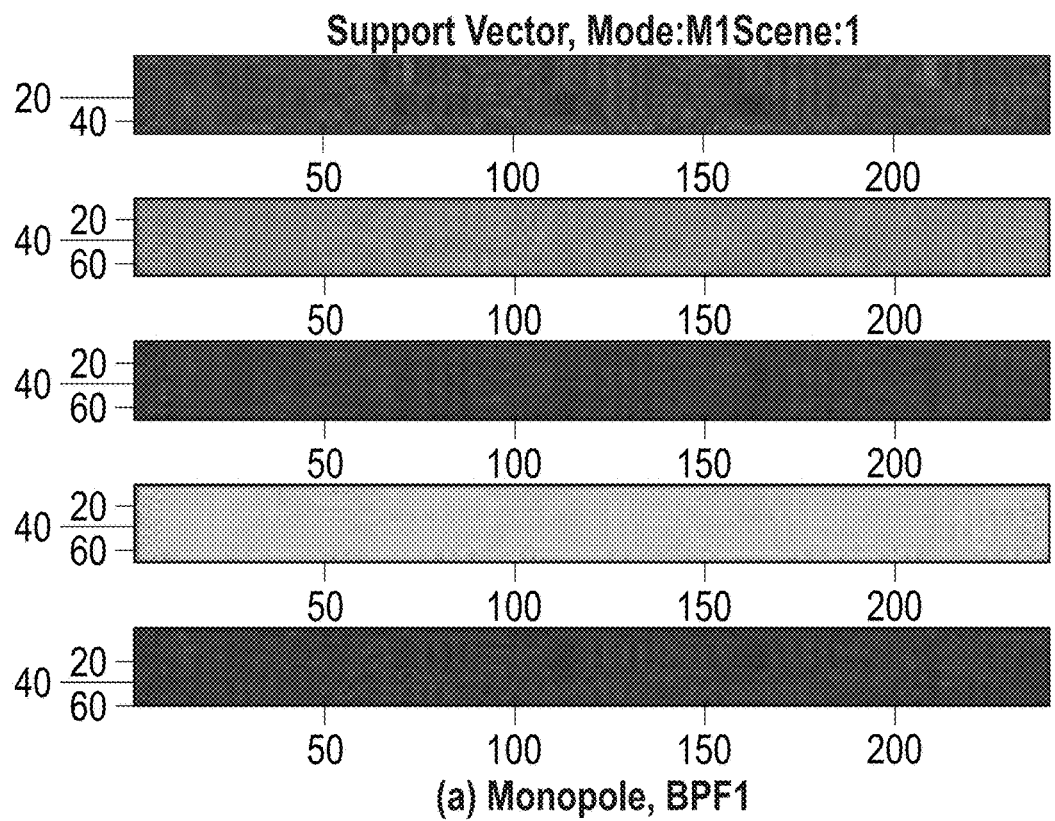
Figure 26B:
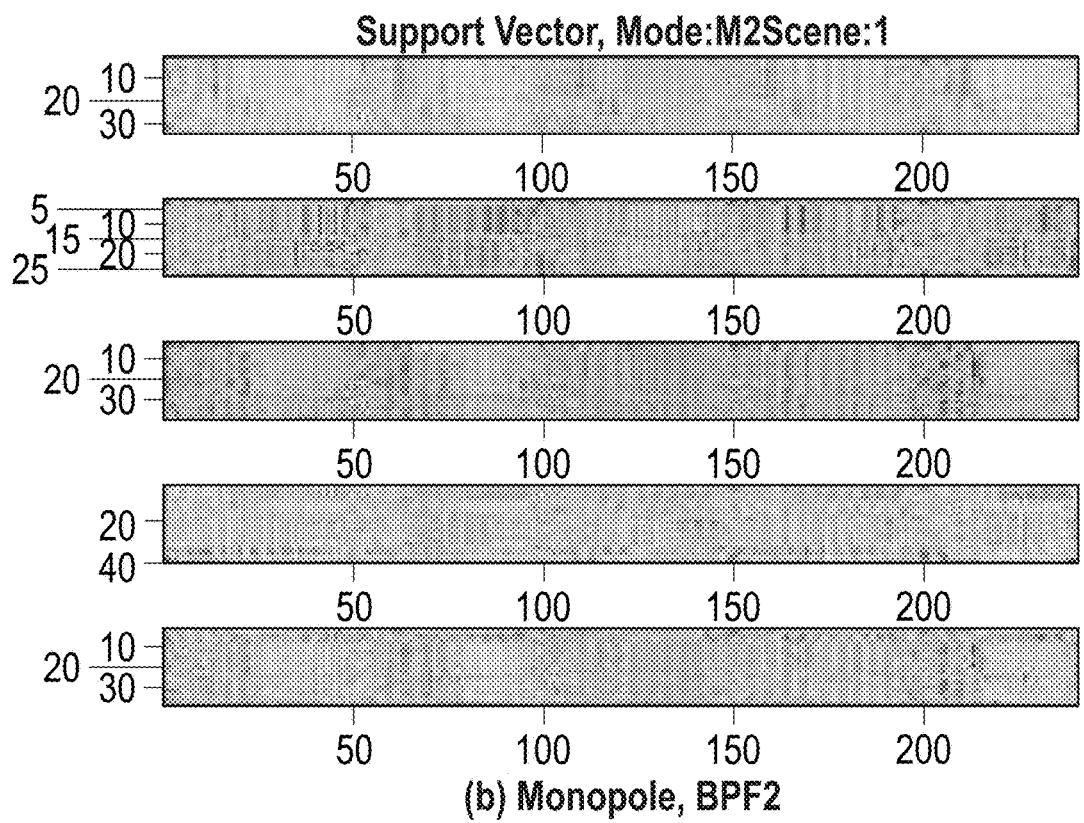
Figures 26F, 26G, 26H:
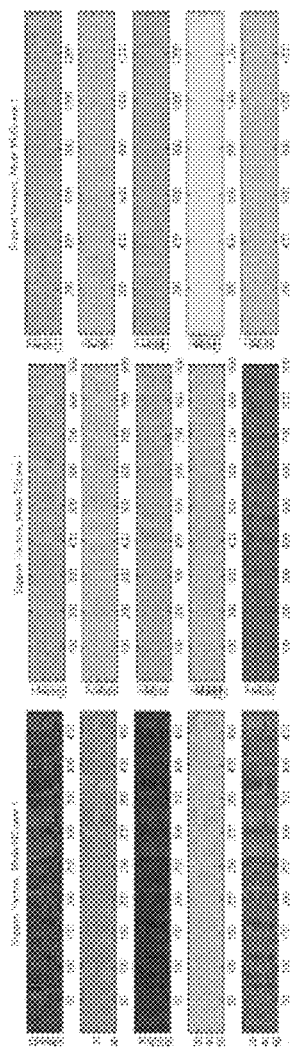

Supplying the bottleneck features of the auto-encoder to the SVM, classification maps over depth interval of interest are generated for the two test sets respectively in FIG. 24 and FIG. 25. In each figure, classification results are shown for eight modalities: monopole BPF1, monopole BPF2, dipole MPF1, dipole MPF2, dipole MPF3, monopole BPF1-2, dipole BPF1-3, and combined monopole BPF1-2 and dipole BPF1-3. Classification rates on the cross-validation set and unlabeled multiband multimodality data are in Table 8.

TABLE 8

Classification results using AE + SVM on cross-validation set and two unlabeled multiband multimodality datasets.

| AE + SVM Dataset | Classification Rate per Label (1-5) on CV Data | Classification Rate-Scene 1 | Classification Rate-Scene 2 |
|---|---|---|---|
| MONO BPF1 | 1, 0.993, 0.993, 1, 0.98 | 1 | 1 |
| MONO BPF2 | 1, 1, 1, 1, 1 | 1 | 1 |
| DIP BPF1 | 0.913, 0.75, 0.573, 0.473, 0.793 | 0.705 | 0.75 |
| DIP BPF2 | 0.98, 0.98, 0.993, 0.973, 0.980 | 0.99 | 0.99 |
| DIP BPF3 | 1, 1, 1, 1, 1 | 1 | 1 |
| MONO BPF1-2 | 1, 1, 1, 1, 1 | 1 | 1 |
| DIP BPF 1-3 | 1, 0.953, 0.98, 0.96, 0.98 | 0.985 | 0.99 |
| MONO+DIP | 1, 0.953, 0.993, 0.967, 0.98 | 0.985 | 0.99 |

Data used for Autoencoder features falls in one of the groups of multiband data: for monopole source, BPF1 = [1, 5] kHz, and BPF2 = [5, 12] kHz, and for dipole data, 3 frequency bands are BPF1 = [1, 2.5] kHz, BPF2 = [2.5, 5.5] kHz, and BPF3 = [5.5, 12] kHz.

FIGS. 26a-26h depict support vectors corresponding to various multiband modalities for the five labels of interest for the monopole BPF1 data, the monopole BPF2 data, the dipole BPF1 data, the dipole BPF2 data, the dipole BPF3 data, the aggregate monopole BPF1-2 data, the aggregate dipole BPF1-3 data, and the aggregate of all monopole and dipole data. Mel-Frequency Cepstral Coefficients (MFCC)

MFCC are known in the literature as Mel-frequency cepstral coefficients. See, e.g., K. Prahalad, "Speech technology: A practical introduction," *Carnegie Mellon University & International Institute of Information Technology Hyderabad PPT*, (2003). They are widely used for signal classification and speech recognition. In one embodiment, for a training dataset, MFCC may be used as the features for a SVM classifier. These features can be generated through the following steps.

First, the short time Fourier transform (a windowed excerpt) is applied to a signal:

$$X[k] = DFT(x[n]) \quad (4)$$

The powers of the spectrum obtained above are mapped onto the Mel scale through:

$$Mel(f) = 2595 \times \log_{10}\left(1 + \frac{f}{700}\right) \quad (5)$$

Next, triangular overlapping windows are used and logs of the powers at each of the mel frequencies are taken, $$Y[m] = \log\left(\sum_{k=f_{m-1}}^{f_{m+1}} |X[k]|^2 B_m[k]\right) \quad (6)$$

where:

$$B_m[k] = \begin{cases} 0 \\ \frac{k - f_{m-1}}{f_m - f_{m-1}}, k \in [f_{m-1}, f_m] \\ \frac{f_{m+1} - k}{f_{m+1} - f_m}, k \in [f_m, f_{m+1}] \end{cases} \quad (7)$$

The last step involves taking the discrete cosine transform for the list of Mel log powers, as if it were a signal (see, S. Young, et al., *The HTK Book* (Version 3.4), Cambridge University Engineering Department, (2006)):

$$c[n] = \frac{1}{M}\sum_{m=1}^{M} Y[m]\cos\left(\frac{\pi n(m - 0.5)}{M}\right) \quad (8)$$

The MFCC are the amplitudes of the resulting spectrum after liftering (filtering in the cepstral domain) (see, S. Young, et al. *The HTK Book* (Version 3.4), Cambridge University Engineering Department, (2006)), $$c'[n] = \left(1 + \frac{L}{2}\sin\frac{\pi n}{L}\right) \times c[n]. \quad (9)$$

MFCC is a time frequency representation. One can vectorize the 2D MFCC features when using SVM. In one embodiment, MFCCs are generated from each waveform. The frame duration may be set at 2.6 ms, with 1 ms set as the frame shift. By way of example, 30 filterbank channels and 22 cepstral coefficients (the number of cepstral coefficients should be less than the number of filterbank channels) are chosen. The lower and upper frequency limits are set to 2000 and 10000 Hz, and the cepstral sine lifter parameter is 2000 (2000 is a default value in MFCCs processing).

Figure 27:
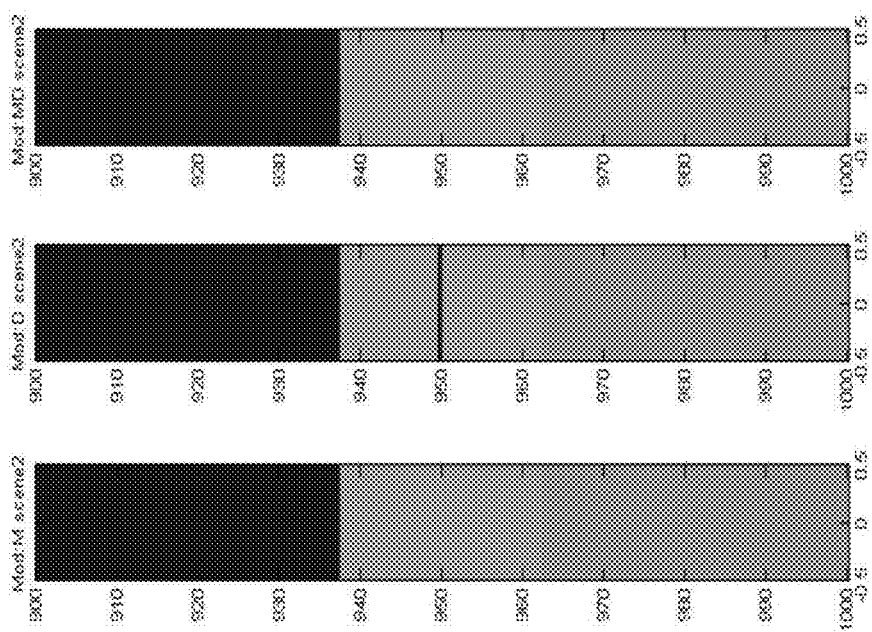
FIG. 27 depict Mel-frequency cepstral coefficient (MFCC) methods.

Some classification results are shown in FIG. 27. For the monopole data, the classification rate on Scenario 2 data is 1, and classification rate on CV data is 0.9987, which breaks down as: classification rate equal to 1 for labels 1-4, and classification rate of 0.993 for label 5. For the aggregate dipole data, the classification rate on Scenario 2 data is 0.995, and classification rate on CV data is 0.9973, which breaks down as: classification rate equal to 1 for labels 1, 2, 3, and 5, and classification rate of 9866 for label 4. Finally, for combined monopole and dipole modalities (Mod MD scene 2), all above mentioned rates are equal to 1.

Classification Using Convolutional Neural Networks (CNN)

Convolutional neural network (CNN) can be used for image recognition, video classification, semantic segmentation, and object localization. A CNN consists of multiple layers of neurons which can process portions of the input images called receptive fields. The outputs of these collections are then tiled so that their input regions overlap. For better representation, this is repeated for each layer. Tiling allows CNN to deal with translations of the input data. Compared to multilayer perceptron (MLP), CNN does not suffer from dimensionality, and scales well to higher resolution images. It has the following distinguishing features: 3D volumes of neurons, local connectivity and shared weights. These properties allow CNN to achieve better generalization on computer vision problems.

CNN Parameters

Figure 28:
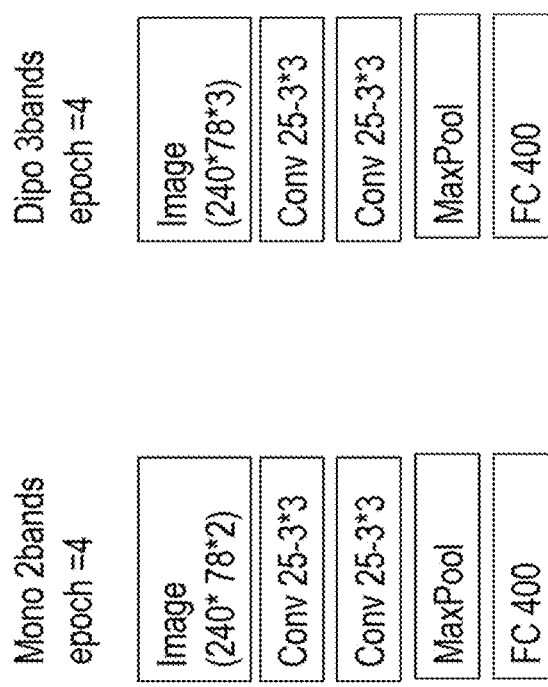
FIGS. 28a and 28b respectively depict convolutional neural network (CNN) parameters for monopole and dipole data.

For purposes of the machine learning module implementing CNN on STC images. in order to reduce the computation burden, according to embodiments, the STC 2D images may be downsampled, e.g., to 40%. Then, the downsampled images may be cropped and fed into the CNN. As suggested by FIG. 28, separate CNNs for the monopole and the dipole data may be designed. Each training sample can be a 2D image or a 3D tensor. By way of example only, 400 neurons may be used in the first fully-connected (FC) layer and 450 neurons for monopole and dipole data separately. In FIG. 28, two convolutional layers are shown applied with a receptive field of size of each neuron being 3*3. A single max pooling layer is shown. Except for the situation where STC 2D images are utilized, MFCCs and bottleneck features can also be put into the CNN. In the next section, we will show how to combine the information from different modalities.

Visualization of CNN

Figure 29:
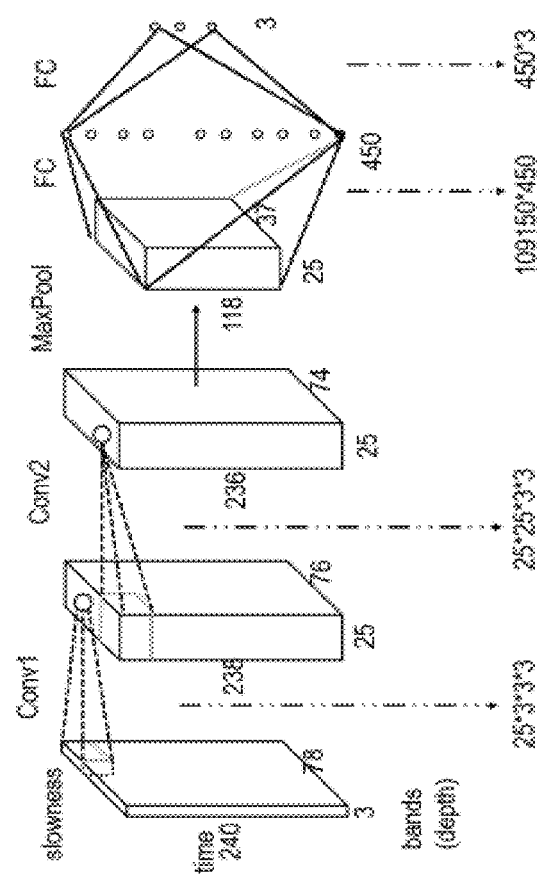
FIG. 29 depicts dimensions of single stream CNN (dipole input)
Figure 30A:
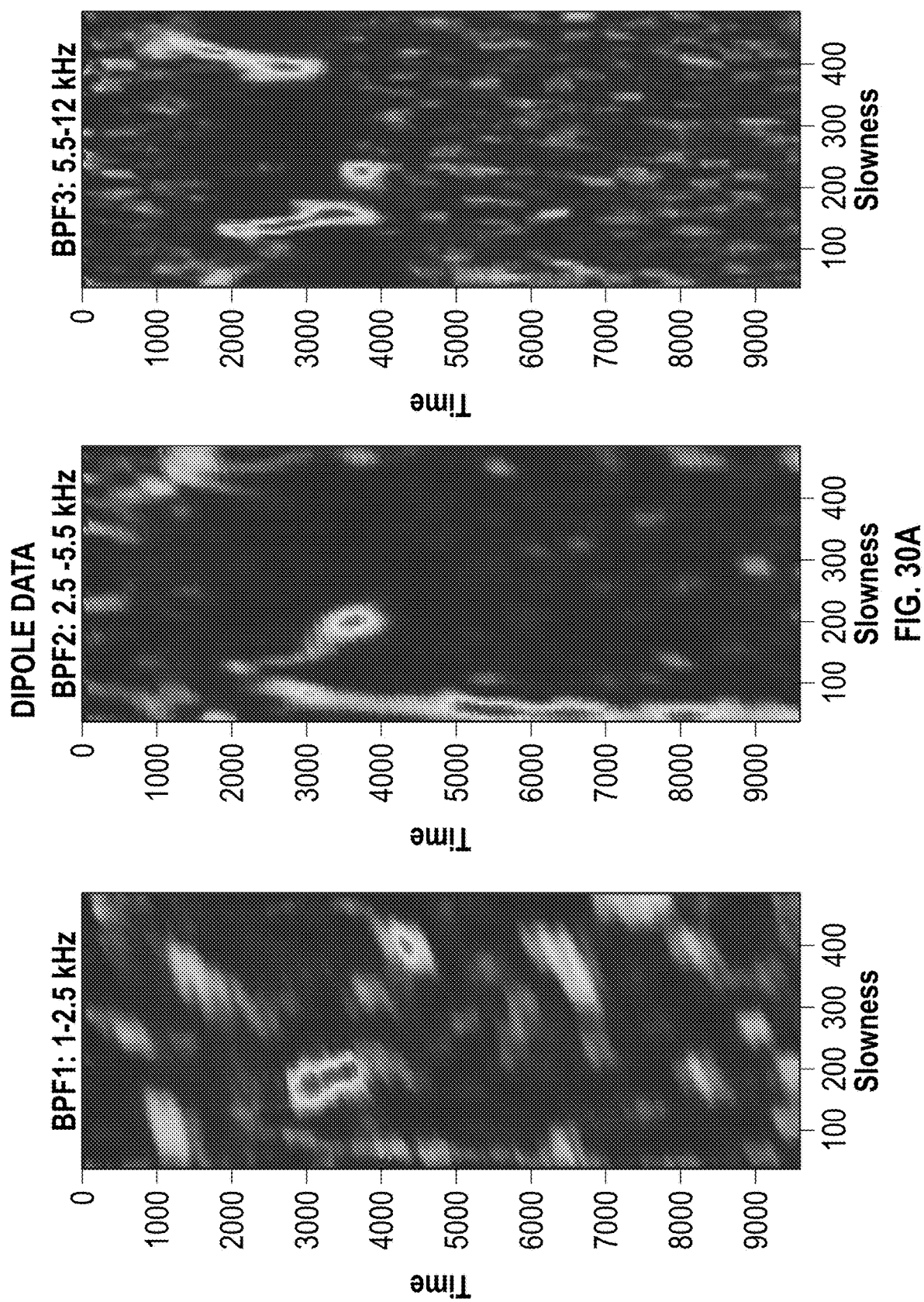
FIGS. 30a and 30b respectively depict STC 2D images (3 dipole bands) used in generating the activation maps, and filter weights computed from the first convolution stage.
Figure 30B:
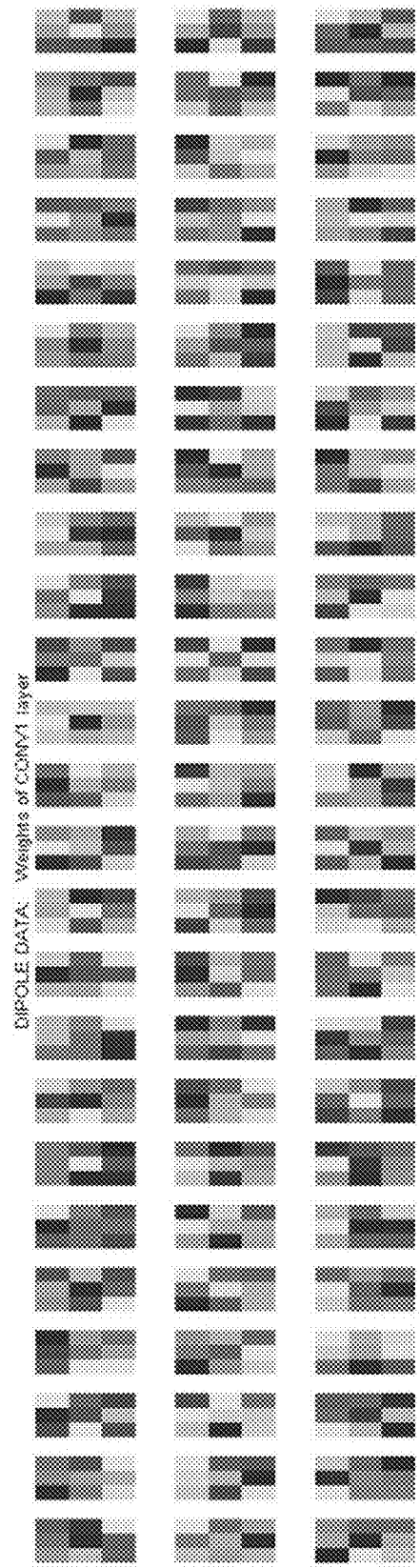

For purposes of illustrating CNN visualization results, the dipole data based CNN model is used as an example. A specific arrangement of a CNN is shown in FIG. 29 corresponding to FIG. 28 where three 2D STC maps size 240×78 are scanned by a 3*3(*3) window to convolutional layer 1 (size 238×76×25). A similar window of 3*3*25 is scanned to convolutional layer 2 (size 236×74×25), and a max pool layer is used to reduce the input into the fully connected layer to 118×37×25. The fully connected layer is shown (in this case) to provide three output classes with associated weights, it being appreciated that in other embodiments, different numbers of classes may be generated. The highest weight value is then selected (as suggested by equation (2)) as the determined label (answer product). The multiband sample STC 2D data (maps) which are input into the CNN is shown in FIG. 30*a*, and the filter weights computed from convolutional layer 1 operation are shown in FIG. 30*b*. The weights look like edge detectors which can detect edges from different angles. To observe the activation map, a training sample from label 3 in FIG. 30*b* is selected and the activation maps from convolutional layers 1 and 2 are plotted separately. The activation maps seem to be the combination of those three STC 2D images, and they are shown in FIG. 31*a* and FIG. 31*b*.

Figure 31A:
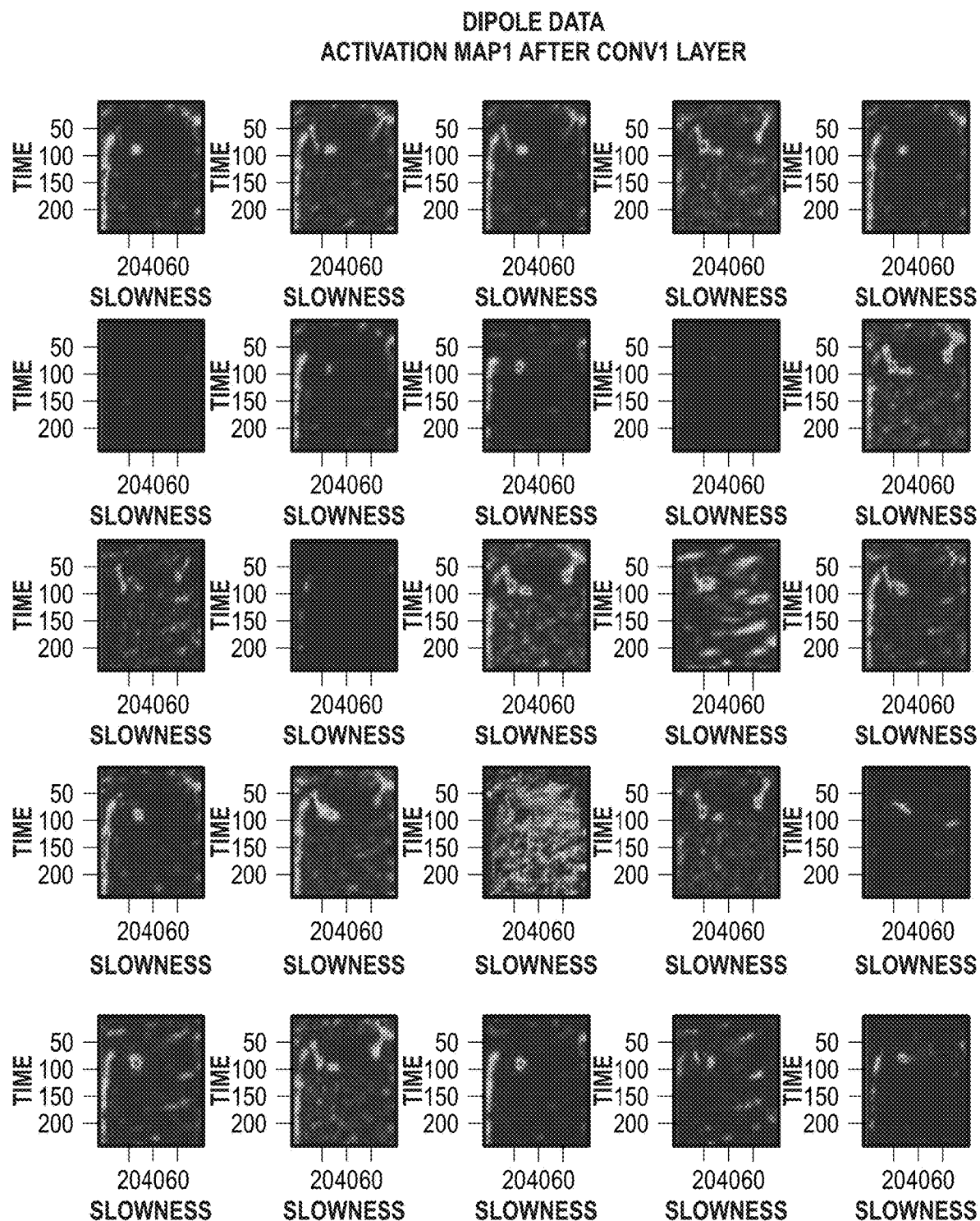
FIGS. 31a and 31b respectively depict activation maps for dipole inputs after a CONV1 layer and after a CONV2 layer.
Figure 31B:
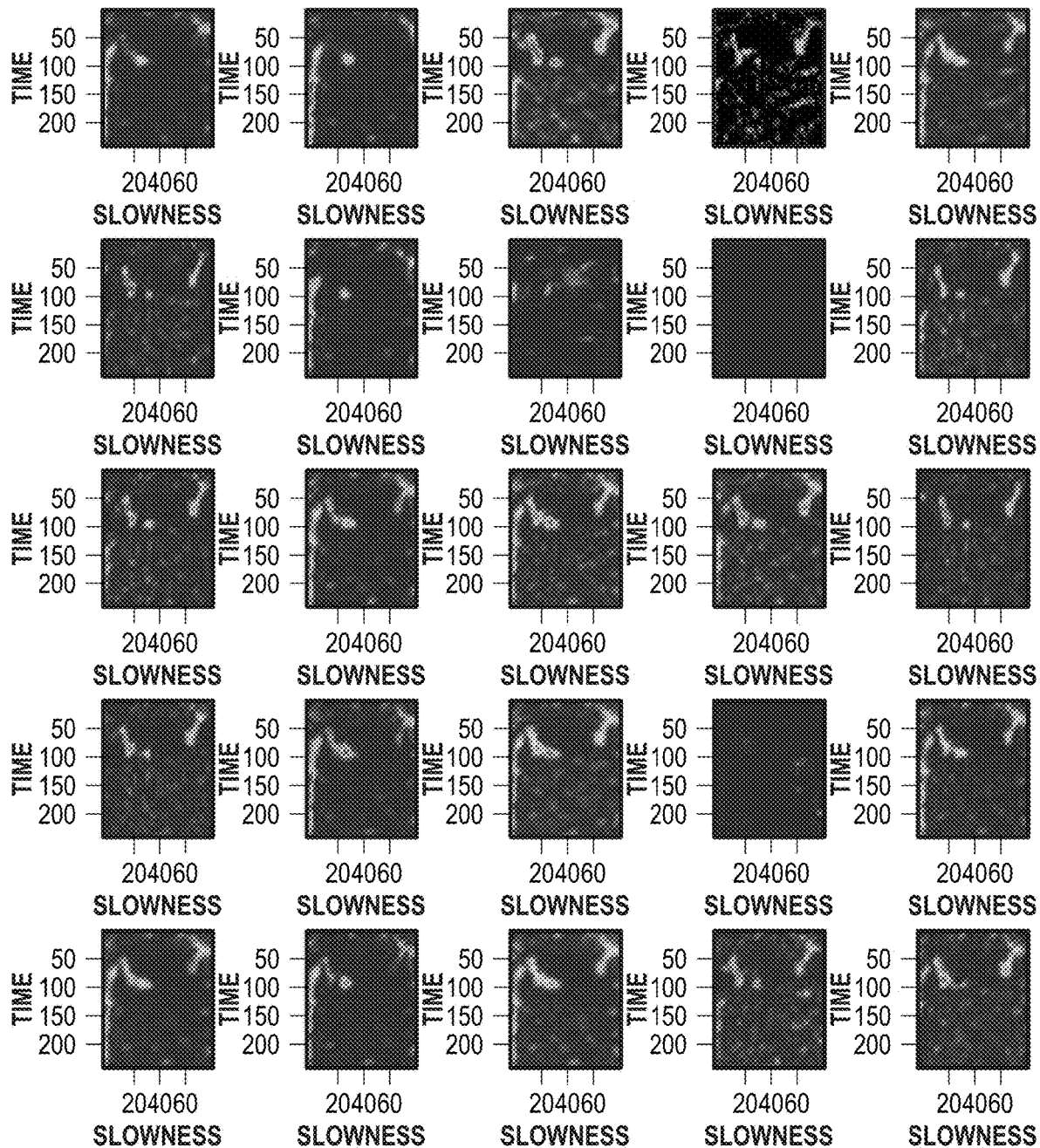
Figure 32A:
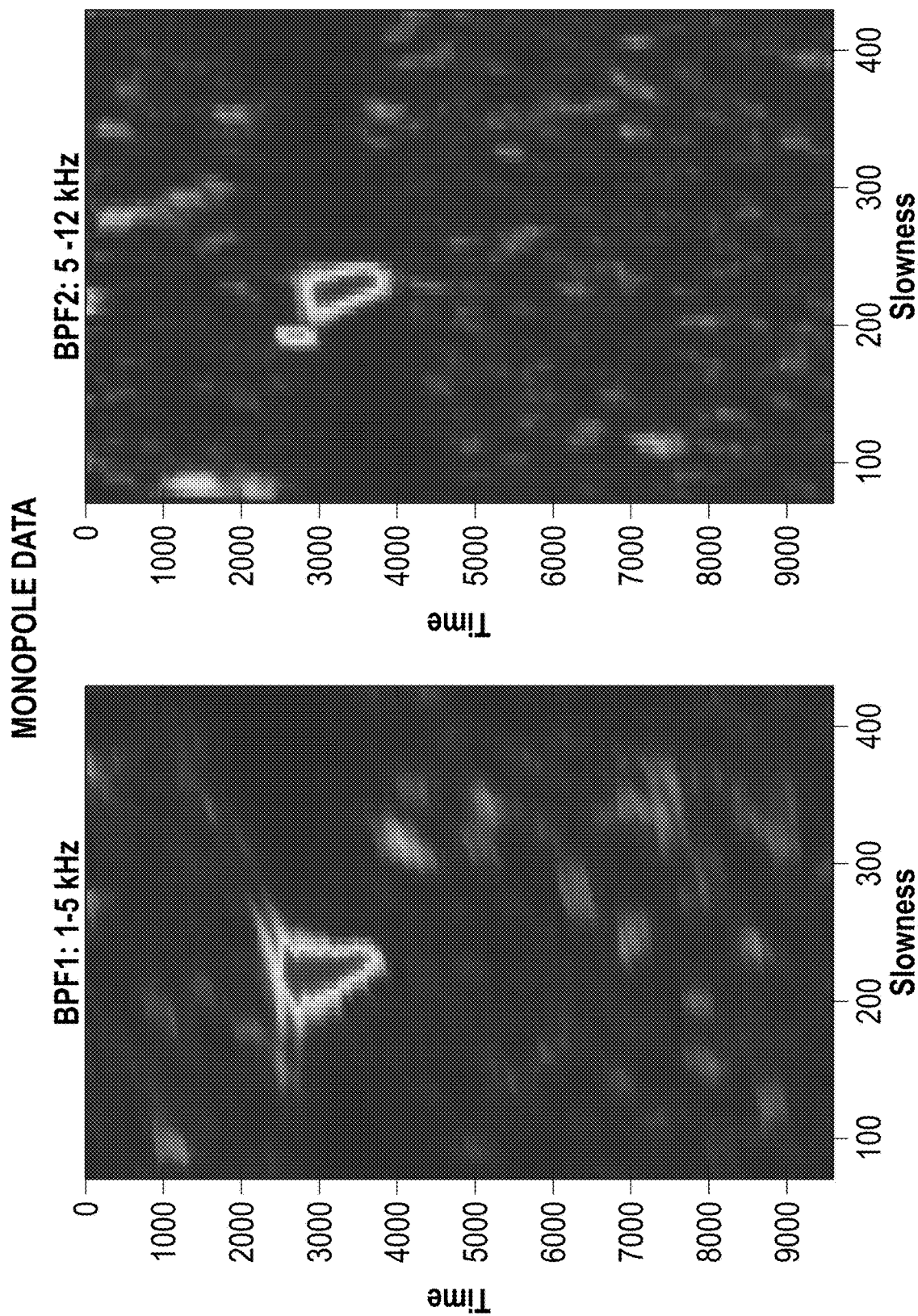
FIGS. 32a and 32b respectively depicts STC 2D images (2 monopole bands) used in generating the activation maps, and filter weights computed from the first convolution operation.
Figure 32B:
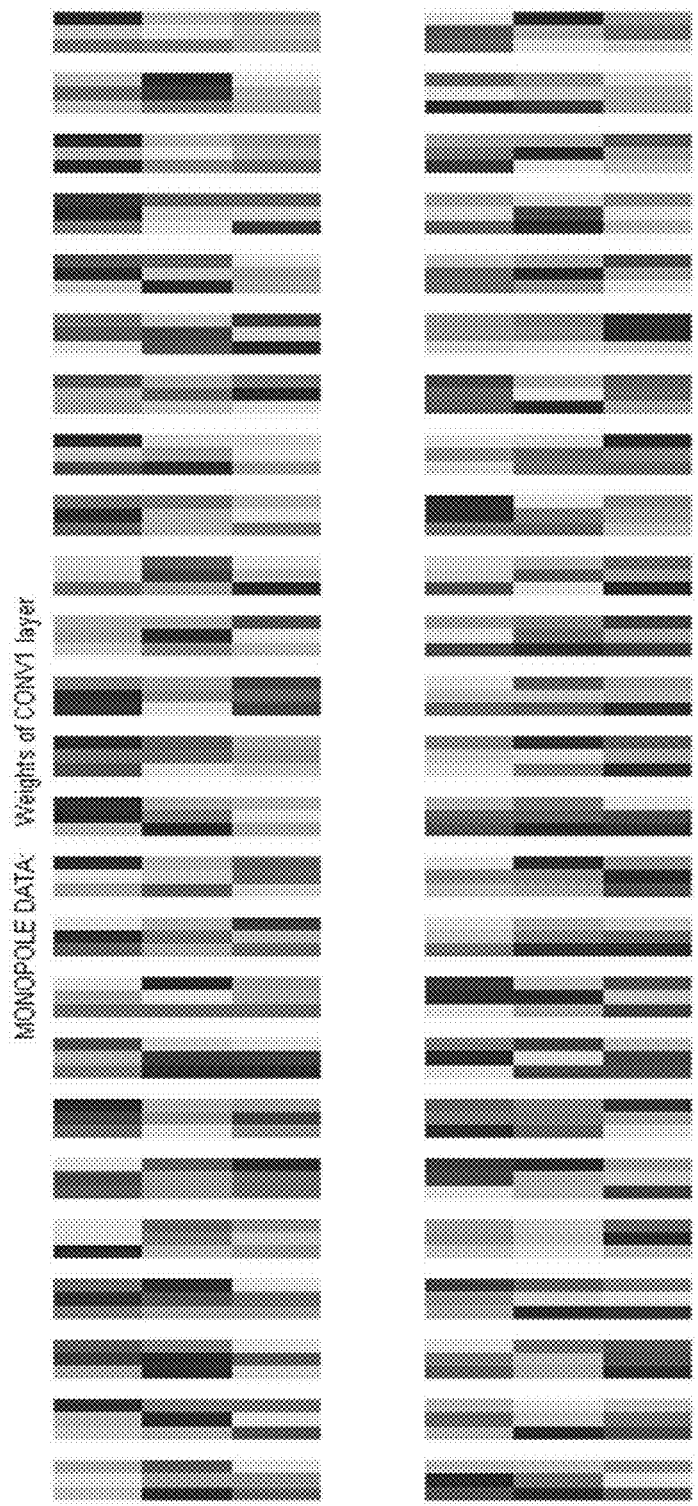
Figure 33A:
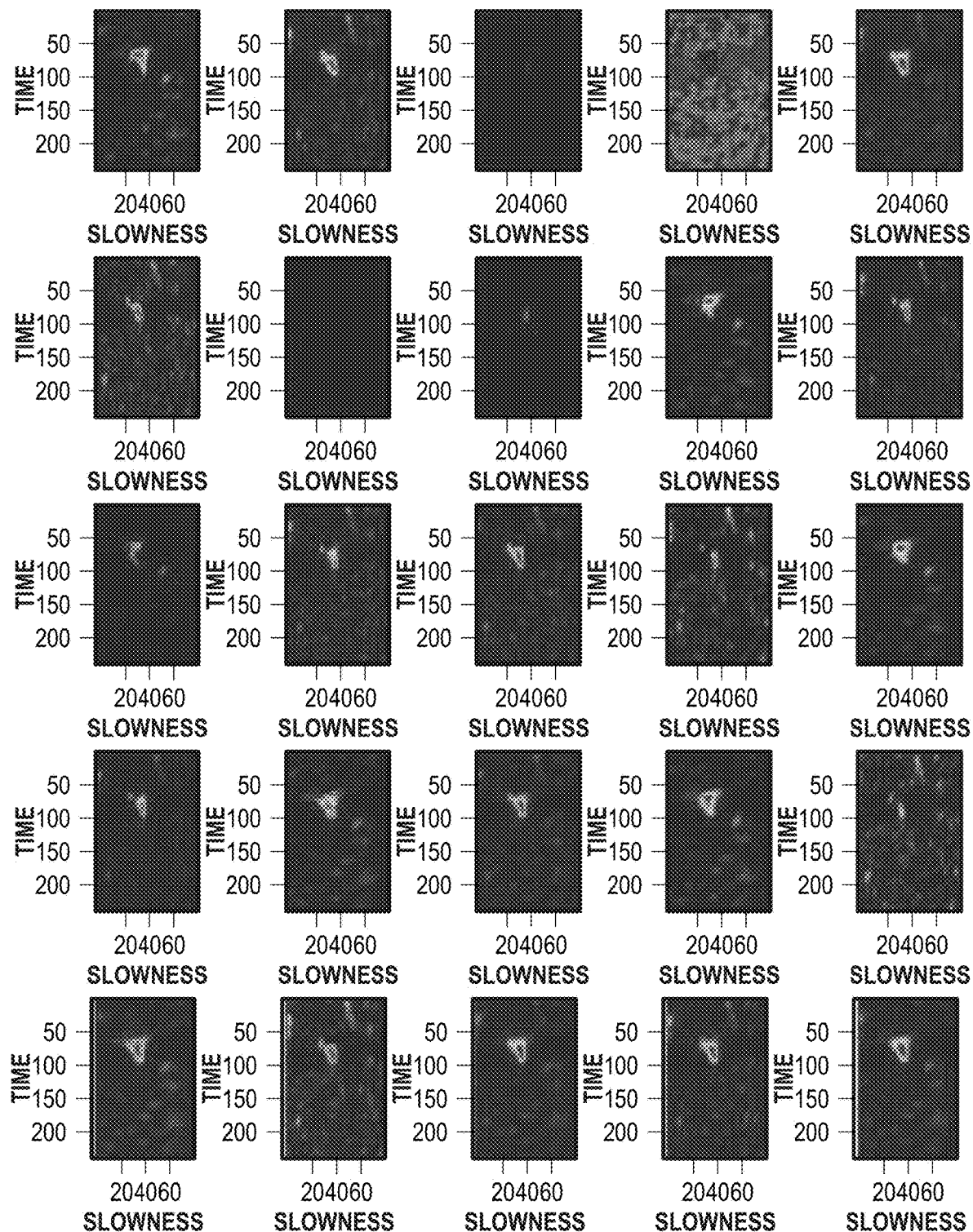
FIGS. 33a and 33b respectively depict monopole activation maps after a CONV1 layer and after a CONV2 layer.
Figure 33B:
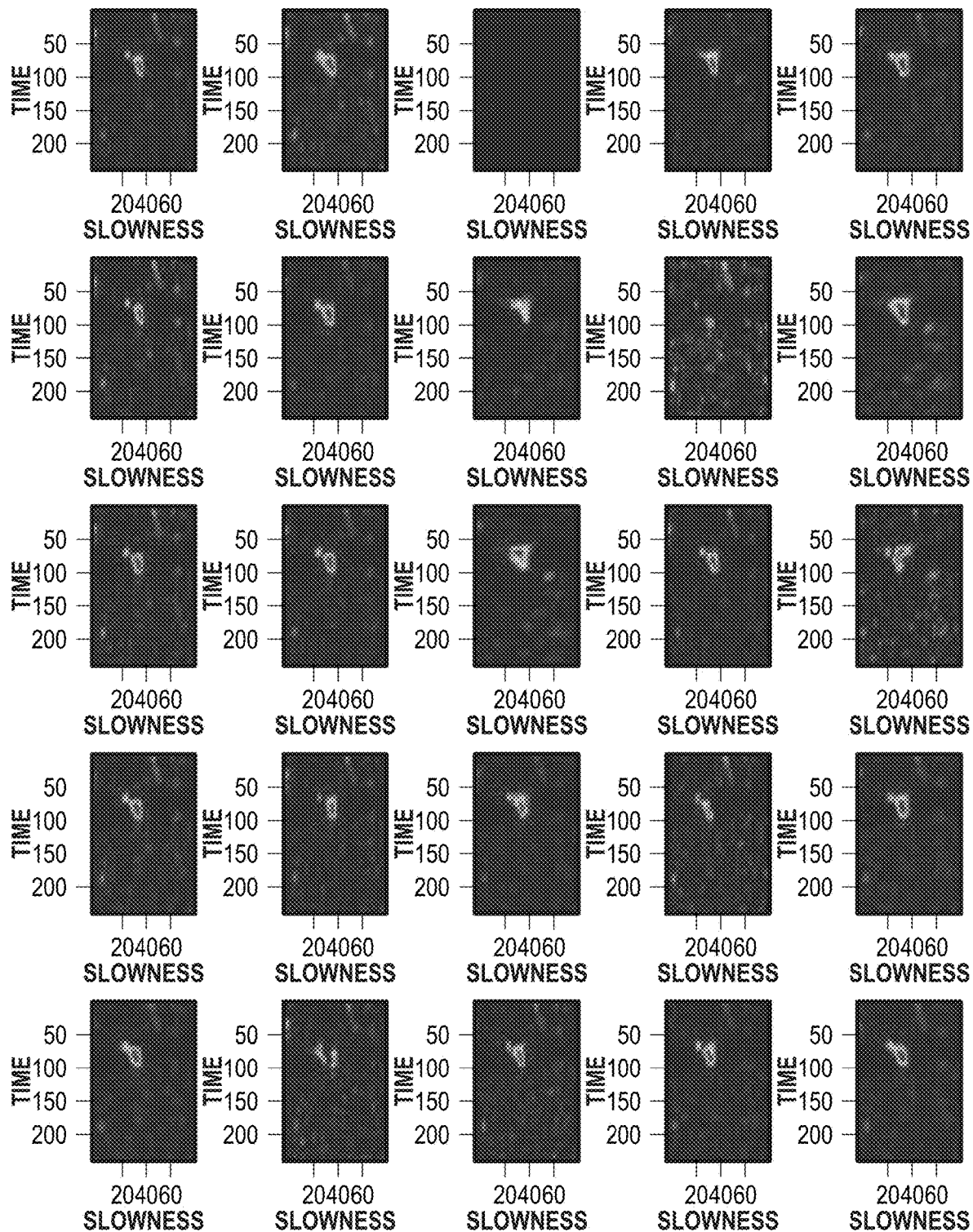
Figures 35A, 35B:
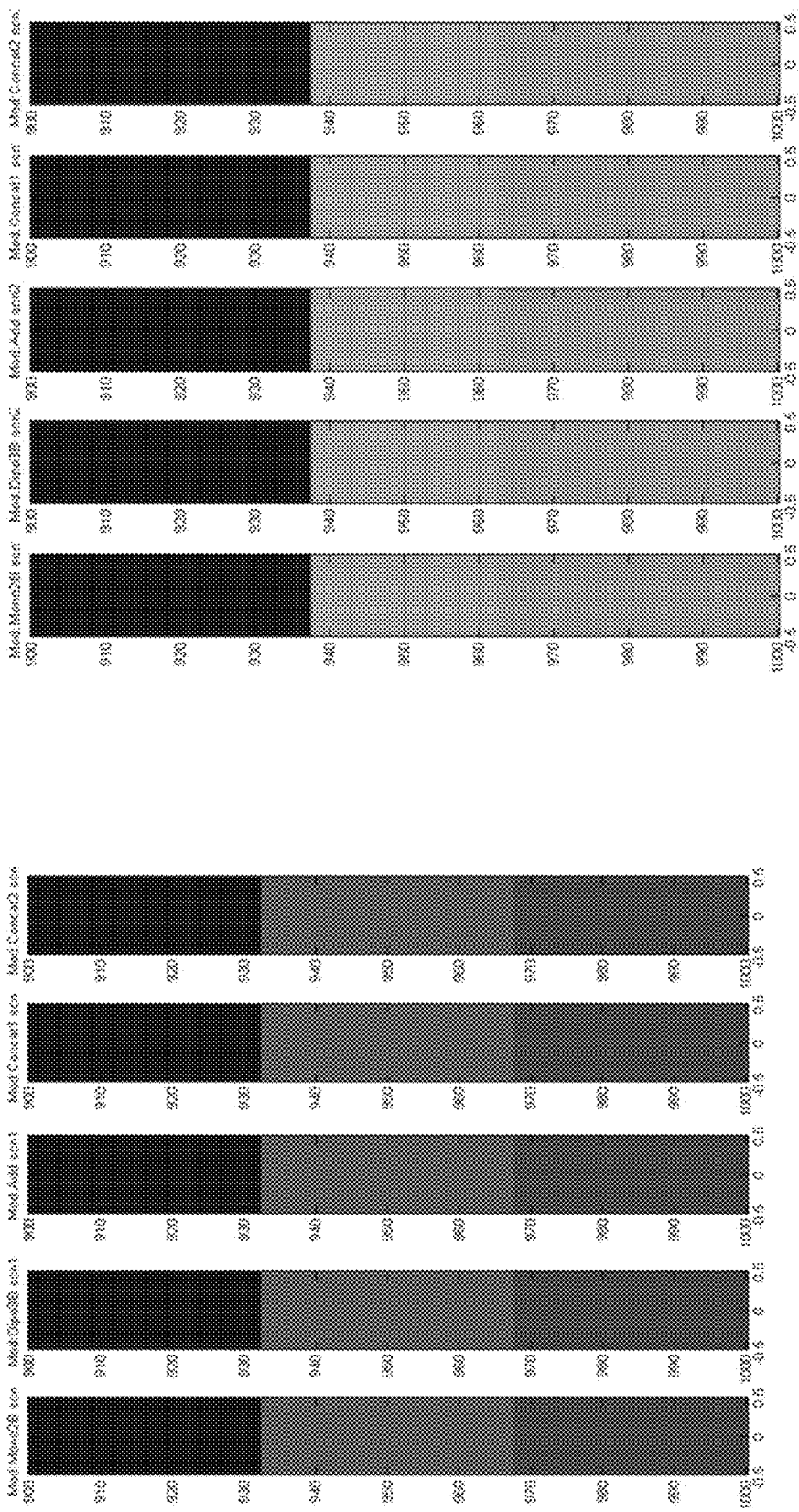
FIGS. 35a and 35b depict classification of multiband multimodality data from Scenario 1 & 2 using CNN methods, with the first panel of both FIGS. 35a and 35b showing classification using two band monopole data, the second panel showing classification results using three band dipole data, and the last three panels showing three methods for combining two streams of data, respectively.

Comparing activation map 1 of FIG. 31*a* and activation map 2 of FIG. 31*b*, the features in activation map 2 appear much sharper. For monopole data, similar STC 2D input maps and filter weights are shown in FIGS. 32*a* and 32*b*, while similar activation maps are shown in FIGS. 33*a* and 33*b*.

Joint Training With 2 Streams

According to one aspect, three frameworks (embodiments) are provided for combining the features from monopole and dipole data, all based on CNNs. As seen in FIG. 34, a first type of CNN (denoted by CNN T1) adds (sums) the outputs from fully connected layers from different modalities (e.g., monopole and dipole) together before feeding into another fully connected layer. The second type of CNN (denoted by CNN T2) concatenates the fully connected layers from monopole and dipole modalities. The third type of CNN (denoted by CNN T3) also concatenates the fully connected layers from the monopole and dipole modalities but adds one more fully connected layer based on the second type of CNN, for further dimension reduction.

For a fast implementation of CNNs, an integrated development environment composed of Anaconda (a free and open source distribution of the Python and R programming languages, Theano (a Python library that permits defining, optimization, and evaluation of mathematic expressions), and Keras (a higher level library which operates over Theano and stream-lines the process of building deep learning networks) may be used. To run the auto-encoder, OPENBLAS (or BLAS) library may be used.

Turning now to FIGS. 37*a* and 37*b*, results for different CNN classifications for scenarios 1 and 2 respectively are shown side by side. Thus, in each figure, the left-most plot shows results for CNN where the input is two-band monopole STC data, and from left to right, the next plots show results for three-band dipole STC data, and combined streams using summation of monopole and dipole (T1), concatenation of monopole and dipole (T2), and concatenation plus an additional fully connected layer (T3). It may be concluded that in the synthetic data case, all CNN-based classifiers give perfect classification.

In one aspect, the CNN model parameters, such as the convolutional filter parameters are trained by optimizing an objective function similar to equation (1) using stochastic descent algorithms.

Some of the methods and processes described above, including, but not limited to the STC processing and the machine learning module, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. By way of example only, while particular examples were given of labels for specific combinations of states for the inner and outer annuli of a well, labels for other states and combinations thereof may be utilized such as a label for an inner annulus and an outer annulus of said annuli being filled with cement, a label for the inner annulus being filled with water and the outer annulus being filled with cement, a label for the inner annulus being filled with cement and the outer annulus being filled with water, and a label for the inner and outer annuli being filled with water. Also, by way of example only, while CNNs having a particular window sizes and particular numbers of convolutional layers, maxpool layers, and fully connected layers were described, it will be appreciated that the CNNs may be constructed with different window sizes, and different numbers of layers. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method of characterizing the status of annuli of a multiple-cased well of interest, comprising:
utilizing a dataset of labeled slowness time coherence (STC) samples obtained from processing at least one of (i) synthesized sonic data and (ii) measured sonic data obtained from a multiple-cased well, training a machine learning module to receive STC sample inputs and provide output labels for a plurality of states for annuli of a multiple-cased well;
locating a sonic tool having at least one transmitter and multiple detectors at a location in the well of interest;
firing the at least one transmitter, and detecting with the multiple detectors the resulting sonic waveforms impacted by annuli of the well of interest;
preprocessing the sonic waveforms to obtain at least one STC map, wherein said preprocessing the sonic waveforms comprises bandpass filtering said sonic waveforms into at least two bands and conducting STC processing on each band separately;
providing the at least one STC map as the STC sample inputs of the machine learning module to obtain an indication of the status of the annuli of the multiple-cased well adjacent the location of the sonic tool.

2. The method of claim 1, wherein said machine learning module implements at least one of a convolutional neural network (CNN), a support vector machine (SVM), and an auto-encoder.

3. The method of claim 1, wherein said at least one transmitter includes a monopole transmitter and a dipole transmitter and said preprocessing the sonic waveforms comprises separately filtering sonic waveforms resulting from waves detected as a result of the firing of the monopole transmitter and waves detected as a result of the firing of the dipole transmitter.

4. The method of claim 3, wherein said preprocessing the sonic waveforms comprises separately bandpass filtering the sonic waveforms resulting from waves detected as a result of the firing of the monopole transmitter into at least two bands, and separately bandpass filtering the sonic waveforms resulting from waves detected as a result of the firing of the dipole transmitter into at least two bands.

5. The method of claim 1, wherein said machine learning module implements a CNN, said preprocessing the sonic waveforms to obtain at least one STC map comprises preprocessing the sonic waveforms to obtain at least one 2D STC map and said at least one 2D STC map is provided as the STC sample inputs to the CNN by scanning a window over pixels of the at least one 2D STC map.

6. The method of claim 5, wherein said preprocessing the sonic waveforms comprises bandpass filtering said sonic waveforms into at least two bands and conducting STC processing on each band separately such that said at least one 2D STC map comprises a plurality of 2D STC maps corresponding to each band.

7. The method of claim 6, wherein said at least one transmitter includes a monopole transmitter and a dipole transmitter and said preprocessing the sonic waveforms comprises separately filtering sonic waveforms resulting from waves detected as a result of the firing of the monopole transmitter and waves detected as a result of the firing of the dipole transmitter and separately bandpass filtering the sonic waveforms resulting from waves detected as a result of the firing of the monopole transmitter into at least two bands and separately bandpass filtering the sonic waveforms resulting from waves detected as a result of the firing of the dipole transmitter into at least two bands and conducting STC processing on each band separately such that said at least one 2D STC map comprises a plurality of 2D STC maps corresponding to each band.

8. The method of claim 7, wherein the CNN includes a plurality of convolutional layers, at least one maximum pooling layer, and at least one fully connected layer.

9. The method of claim 8, wherein the CNN has a first set of convolutional layers and a fully connected layer for 2D STC maps corresponding to the data from the monopole transmitter, and a second set of convolutional layers and fully connected layer for 2D STC maps corresponding to the data from the dipole transmitter, results of the fully connected layer for the data from the monopole transmitter and results of the fully connected layer for the data from the dipole transmitter being summed in the fully connected layer which provides said indication of the status of the annuli of the multiple-cased well.

10. The method of claim 9, wherein the CNN has a first set of neural network convolutional layers for 2D STC maps corresponding to the data from the monopole transmitter, a second set of neural network convolutional layers for 2D STC maps corresponding to the data from the dipole transmitter, and a fully connected layer where results of the first set and second set of neural networks are concatenated and which provides said indication of the status of the annuli of the multiple-cased well.

11. The method of claim 10, wherein the CNN has a first set of neural network convolutional layers for 2D STC maps corresponding to the data from the monopole transmitter, a second set of neural network convolutional layers for 2D STC maps corresponding to the data from the dipole transmitter, a first fully connected layer where results of the first set and second set of neural networks are concatenated, and a second fully connected layer that receives the output of the first fully connected layer and provides said indication of the status of the annuli of the multiple-cased well.

12. The method of claim 1, wherein said machine learning module implements a SVM, said preprocessing the sonic waveforms to obtain at least one STC map comprises preprocessing the sonic waveforms to obtain a 1D STC vector map and said 1D STC vector map is provided as the STC sample inputs to said SVM.

13. The method of claim 12, wherein said preprocessing the sonic waveforms comprises bandpass filtering said sonic waveforms into at least two bands and conducting STC processing on each band separately such that said at least one 1D STC vector map comprises a plurality of 1D STC vector maps corresponding to each band.

14. The method of claim 12, wherein said at least one transmitter includes a monopole transmitter and a dipole transmitter, and said preprocessing the sonic waveforms comprises separately filtering sonic waveforms resulting from waves detected as a result of the firing of the monopole transmitter and waves detected as a result of the firing of the dipole transmitter and separately bandpass filtering the sonic waveforms resulting from waves detected as a result of the firing of the monopole transmitter into at least two bands, and separately bandpass filtering the sonic waveforms resulting from waves detected as a result of the firing of the dipole transmitter into at least two bands and conducting STC processing on each band separately such that said at least one 1D STC vector map comprises a plurality of 1D STC vector maps corresponding to each band.

15. The method of claim 1 wherein said machine learning module implements an auto-encoder, said preprocessing the sonic waveforms to obtain at least one STC map comprises preprocessing the sonic waveforms to obtain either a 1D STC vector map or a 2D STC map which is provided as the STC sample inputs to said auto-encoder.

16. The method of claim 15, wherein said auto-encoder includes a bottleneck where bottleneck features are defined and said machine learning module further implements an SVM where said bottleneck features are provided as inputs to said SVM.

17. The method according to claim 1, further comprising: moving the sonic tool to another location in the well of interest, and repeating said firing, preprocessing and providing in order to obtain an indication of the status of the annuli of the multiple-cased well adjacent the other location of the sonic tool.

18. The method according to claim 17, further comprising: using the indications of the status of the annuli of the multiple-cased well, making a decision regarding remedial action with respect to the well of interest.

19. The method according to claim 1, wherein said output labels for said plurality of states for annuli include a label for an inner annulus and an outer annulus of said annuli being filled with cement, a label for the inner annulus being filled with water and the outer annulus being filled with cement, a label for the inner annulus being filled with cement and the outer annulus being filled with water, and a label for the inner and outer annuli being filled with water.

* * * * *